United States Patent
Takemoto et al.

(10) Patent No.: US 6,900,574 B2
(45) Date of Patent: May 31, 2005

(54) STEPPING MOTOR

(75) Inventors: Yasuyuki Takemoto, Shizuoka (JP); Takayuki Matsui, Shizuoka (JP)

(73) Assignee: FDK Corporation, Tokyo (JP)

( * ) Notice: Subject to any disclaimer, the term of this patent is extended or adjusted under 35 U.S.C. 154(b) by 14 days.

(21) Appl. No.: 10/343,552

(22) PCT Filed: Aug. 3, 2001

(86) PCT No.: PCT/JP01/06697

§ 371 (c)(1),
(2), (4) Date: Sep. 9, 2003

(87) PCT Pub. No.: WO02/13357

PCT Pub. Date: Feb. 14, 2002

(65) Prior Publication Data

US 2004/0046463 A1 Mar. 11, 2004

(30) Foreign Application Priority Data

| Aug. 3, 2000 | (JP) | ......................... | 2000-235598 |
| Oct. 25, 2000 | (JP) | ......................... | 2000-325795 |
| Oct. 31, 2000 | (JP) | ......................... | 2000-333014 |

(51) Int. Cl.[7] .............................................. H02K 1/12
(52) U.S. Cl. ..................... 310/254; 310/49 R; 310/198
(58) Field of Search ............................. 310/49 R, 51, 310/179, 184, 198

(56) References Cited

U.S. PATENT DOCUMENTS

| 5,132,578 A | | 7/1992 | Iwasa et al. | |
| 5,521,451 A | * | 5/1996 | Oudet et al. | ................. 310/266 |
| 5,959,378 A | | 9/1999 | Stechmann | |
| RE37,027 E | * | 1/2001 | Torok | ......................... 310/181 |
| 6,541,882 B2 | * | 4/2003 | Matsuzawa | ............... 310/49 R |

FOREIGN PATENT DOCUMENTS

| GB | 2230652 A | 10/1990 |
| JP | 55-122472 | 9/1980 |
| JP | 3-94049 | 9/1991 |
| JP | 6-2468 Y2 | 1/1994 |
| JP | 6-38497 A | 2/1994 |
| JP | 6-284680 A | 10/1994 |
| JP | 9-93890 A | 4/1997 |
| JP | 52-61719 A | 5/1997 |

OTHER PUBLICATIONS

International Search Report—PCT/JP01/06697, ISA/JPO; completed Oct. 29, 2001.

* cited by examiner

*Primary Examiner*—Thanh Lam
(74) *Attorney, Agent, or Firm*—Harness, Dickey & Pierce, P.L.C.

(57) ABSTRACT

A stepping motor 10 comprises a rotor 3 of a permanent magnet 2 having multiple poles magnetized in the circumferential direction, and multiple stator yokes 5a and 5b disposed on the outer periphery of this rotor 3 to form a multiple-phase field magnet of multiple phases. Detent torque of the stepping motor is reduced either by reducing a cross-sectional area of a portion, which leads to a magnetic pole surface 51a of the stator yoke, to be less than an area of the magnetic pole surface 51a, or by disposing an intermediate magnetic substance 9 which is magnetically independent of the stator yokes 5a and 5b on both sides thereof. In addition, a stator yoke 5 is formed of two-divided members and both divided members 51 and 52 are connected to each other inside a winding bobbin 7 so as to increase the quality and the workability of assembly.

1 Claim, 16 Drawing Sheets

STEPPING MOTOR

TECHNICAL FIELD

This invention relates to a technology effective for application to stepping motors, in particular, a geared motor incorporating a plurality of gears for transmitting rotary movement of a rotor while decelerating the movement, which is utilized for pointer-drive for on-board instruments, for example.

BACKGROUND ART 1. (Related Art)

In recent years, along with advances in electronic devices such as semiconductors and advances in digital control technologies utilizing microcomputers and the like, digital control with microcomputers are becoming the mainstream of drive control of pointers in pointer instruments for vehicles, such as speedometers, instead of conventional mechanical control.

A pointer instrument can display an analog quantity such as a velocity by a position of a pointer swinging on a scale plate, which is intuitively, understood. For digitally controlling the swing position of the pointer, a stepping motor is coming into use. In this case, the stepping motor is used for positioning of the pointer by open-loop control. Specifically, rotating driving pulses in a forward direction or a backward direction are applied to the stepping motor of which a rotational output shaft is joined to the pointer, so as to effectuate two-way travel of the pointer and to control a travel distance of the pointer according to the number of the rotating driving pulses. Since the amount of rotation (the angle of rotation) of the stepping motor can be uniquely set by the number of the rotating driving pulses, it is possible to position the pointer and the like without adoption of complicated feedback control using a position sensor.

As disclosed in U.S. Pat. No. 5,959,378, for example, such a stepping motor comprises a rotor including a permanent magnet having multiple poles magnetized to be reversed alternately along the circumferential direction, stator yokes each being formed into a bent shape so that two ends thereof respectively constitute magnetic pole portions facing closely to a magnetic pole-passing surface of the permanent magnet, and through-hole shaped winding bobbins on which coils for exciting the stator yokes are pre-wound, and the stepping motor has a structure that intermediate portions of the stator yokes are inserted into the winding bobbins. This stepping motor is usually combined with a deceleration mechanism composed of a plurality of gears and is used for the pointer instrument and the like.

2. (Existing Problems)

The foregoing stepping motor has characteristic and structural problems as described below.

First, regarding the characteristic problems, although the above-described stepping motor generates magnetic attraction between the permanent magnet and the stator yokes, this magnetic attraction is also generated in a non-excited state when electricity is turned off. Further the magnetic attraction differs largely depending on the rotating position (angle) of the rotor. Specifically, there is generated the magnetic attraction which differs largely depending on a relative position between the magnetic pole of the permanent magnet forming the rotor and the magnetic pole portion of the stator yoke. This magnetic attraction generates force to pull the rotor to a specific rotating position even in the non-excited state (when the electricity is turned off), what is called detent torque.

Whereas this detent torque brings an advantage to enable the rotor to be stopped in a position at a given angle even in the non-excited state without provision of a special mechanism, the detent torque also incurs torque ripple in a rotational output of the stepping motor. This torque ripple interferes continuous and smooth rotation and also causes vibration and noise. Further, since the torque ripple is excessively high in the conventional stepping motor, there was a problem that continuous and smooth rotation could not be obtained, and vibration and noise were large.

Therefore, if the conventional stepping motor is used for driving the pointer of the above-described pointer instrument, for example, then there occurs a problem that movement of the pointer is not smooth and therefore the pointer cannot indicate an analog quantity such as a velocity without discomfort. Moreover, since the torque ripple also causes vibration and noise, a problem also occurs that the conventional stepping motor is not suitable for use in a place where silence is required.

This type of stepping motor is frequently used together with a plurality of gears for transmitting the rotation of the rotating shaft of the motor while decelerating the rotation. In this case, a problem also occurs that the noise attributable to the vibration caused by the torque ripple is amplified by the gears and engagement of the gears becomes unstable due to the vibration.

As the related art aiming at reduction in the detent torque, the specification of U.S. Pat. No. 5,959,378 provides the technology of forming the shapes or the magnetic poles of the stator yokes, particularly the surfaces facing close to the magnetic pole-passing surface of the permanent magnet that forms the rotor, in unequal spaces with respect to the magnetic pole passing surface. However, sufficient reduction in the detent torque has turned out to be practically difficult with forming the shapes of the magnetic poles of the stator yokes alone. Moreover, when the shapes of the magnetic poles of the stator yokes were formed as described above, it became clear that other problems were also incurred, such as reduction in rotational torque attributable to an increase in an effective gap between the magnetic poles of the permanent magnet and the magnetic poles of the stator yokes.

As a countermeasure for the noises, it is effective to incorporate the entire motor inclusive or the gears into a plastic casing. The plastic casing is suitable for mass production by molding and is therefore advantageous to cost reduction. Moreover, in the case of an electrically insulative plastic casing, other advantages such as capability of simplifying an insulative structure of motor feeding terminals. However, the plastic casing has more difficulty in dimensional accuracy as compared to that of metal, and the degree of deformation attributable to thermal expansion or the like is also large. Accordingly, distances between pitches of gears tend to fluctuate and smooth transmission of rotation is from time to time inhibited due to occurrence of abnormal engagement such as play between the gears. In some cases, rotation may not be transmitted accurately or there may be even a risk of disability of rotation due to disengagement of the gears.

Next, regarding the structural problems, as described previously, this type of stepping motor comprises the rotor including the permanent magnet having the multiple poles magnetized to be reversed alternately along the circumferential direction, the stator yokes each being formed into the bent shape so that two ends thereof respectively constitute the magnetic pole portions facing close to the magnetic pole-passing surface of the permanent magnet, and the through-hole shaped winding bobbins on which the coils for exciting the stator yokes are pre-wound, and the stepping motor has the structure that the intermediate portions of the stator yokes are inserted into the winding bobbins.

In the above-described structure, although the intermediate portions of the stator yokes are inserted into the through-hole shaped winding bobbins on which the coils for exciting the stator yokes are pre-wound, the stator yokes of the bent shapes cannot be Inserted into the winding bobbins directly. Therefore, the stator yoke was conventionally preformed as two-divided members in the longitudinal direction. Then, one of the divided yoke members was inserted into the winding bobbin, and the relevant divided yoke member and the other divided yoke member were joined together by welding outside the bobbin, thus eventually forming the stator yoke integrated as the bent shape. Alternatively, the magnetically integrated stator yoke of the bent shape was assembled by stacking multiple yoke pieces being divided respectively in the longitudinal direction and in the thickness direction.

However, when the stator yoke is assembled by welding, a problem occurs that magnetic characteristics of a magnetic material constituting the stator yoke vary due to such welding, whereby a given function as the stator yoke cannot be obtained. As the material for the stator yoke, it is necessary to use toe material which guarantees given magnetic characteristics. However, if a process such as welding is performed thereon, such a guarantee cannot be maintained.

It is desirable to provide the stator yoke with plating for protection such as rust-proofing. However, if the plated stator yoke is subjected to the welding process, the processed portion loses protection by plating and a different kind of alloy is formed therein, thus a problem occurs that quality such as rust-proofing cannot be guaranteed.

The problem attributable to welding is avoidable when the stator yoke is assembled by stacking multiple yoke pieces. However, a problem occurs that contact areas and contact conditions at the overlapping portions of the respective yoke pieces become uneven and the given magnetic characteristics cannot be obtained in good reproducibility, and that magnetic fields respectively created by edge portions of the respective yoke pieces adversely affect other yokes. Moreover, since the multiple yoke pieces are used in this case, there is also a problem that the number of components is increased and the respective components tend to separate apart easily, whereby workability of assembly is significantly reduced.

OBJECTS OF THE INVENTION

A first object of the present invention is to provide a stepping motor having a performance suitable for smoothly moving and driving, for example, a pointer of a pointer instrument and the like by an open-loop control.

A second object is to arrange a stepping motor or a geared motor incorporating a plurality of gears for transmitting rotation of this motor while decelerating the rotation, to be capable of obtaining smooth rotational outputs by means of effectively reducing detent torque that incurs torque ripple to the rotational outputs, without deteriorating motor performances such as rotational torque.

A third object is to solve various problems with the stepping motor or the geared motor such as reduction in accuracy incurred by use of an electrically insulative plastic casing, so as to arrange the stepping motor or the geared motor to be advantageous to noise reduction, cost reduction and simplification of the structure of feeding terminals, and to be able to secure smooth and stable rotating operations.

A fourth object is to provide a stepping motor which is improved in quality such as magnetic characteristics of a stator or rust-proofing, and is excellent in the workability of assembly.

Objects and characteristics of the present invention other than those above will become apparent from the description of this specification and the accompanying drawings.

DISCLOSURE OF THE INVENTION

To attain the foregoing objects, the present invention discloses the means as described below.

First principal means of the present invention is a stepping motor comprising a rotor including a permanent magnet having multiple poles magnetized in the circumferential direction, at least two stator yokes disposed on the outer periphery of the rotor, and exciting coils fitted around the stator yokes, in which magnetic pole surfaces on both ends of the stator yokes are disposed as capable of facing the magnetic poles of the permanent magnet. Here, the stepping motor is characterized by being constituted in a manner that cross-sectional areas of given regions of the stator yokes constituting a magnetic path are less than the areas of the magnetic pole surfaces.

In this case, the given region to reduce the cross-sectional area may be part of the magnetic path or the entire magnetic path excluding the portion of the magnetic pole surface. According to an experimental result, detent torque becomes small by making the cross-sectional area of at least part of the magnetic path less than the area of the magnetic pole surface.

More preferably, a distance from the magnetic pole surface to the given region reduced in the cross-sectional area is made smaller compared with a height in an axial direction of the magnetic pole surface (an axial direction of the rotor). In this way, a small cross-sectional portion is formed in a position near to the magnetic pole surface, whereby the detent torque is reduced even less.

Meanwhile, it is also possible to form the magnetic pole surfaces by bending tip portions of the planar stator yokes. In this way, it is possible to manufacture the stator yokes easily and efficiently by a bending process with a pressing machine or the like.

In the case of constituting the stepping motor as a geared motor, the stepping motor, a first gear provided on a rotor shaft of this stepping motor, and a given number of gears linked to this first gear are housed and disposed in given positions in a casing. Then, an output shaft is fitted to a given gear among the gears, and one end of the output shaft is disposed so as to protrude out of the casing.

Note that "approximately U-shaped" stated in the present invention includes a U-shaped plane by all means; however, the plane does not always have to be formed exactly into the U-shape. For example, the plane may be formed into a C-shape, or alternatively, into the U-shape which has perpendicular turns. In short, it is satisfactory if the band-shaped magnetic oath is bent or curved appropriately so that the both ends approach each other and constitute the magnetic pole surfaces.

Second principal means of the present invention is a stepping motor including a rotor including a permanent magnet having multiple poles magnetized to be reversed alternately along the circumferential direction, two or more stator yokes being disposed on the outer periphery of this rotor for forming multi-phase field magnet having two or more phases, and exciting coils for exciting the stator yokes, in which magnetic pole portions of the stator yokes are disposed so as to face close to a magnetic pole-passing surface of the permanent magnet.

Here, the stepping motor is characterized in that an intermediate magnetic substance magnetically independent of the stator yokes on both sides thereof is disposed in a given position between the two adjacent stator yokes for facing close to the magnetic pole-passing surface of the permanent magnet.

Here, the inventors of the present invention have revealed the fact that the intermediate magnetic substance brings a function of considerably reducing the detent torque caused by magnetic attraction between the permanent magnet and the stator yokes. Regarding the mechanism, it is conceivable, for example, that (1) the intermediate magnetic substance being magnetically separated from the stator yokes suppresses occurrence of the detent torque attributable to magnetic influences from the stator yokes; (2) a state of magnetic distribution between the two adjacent stator yokes is flattened by the intermediate magnetic substance, whereby the magnetic attraction trying to pull the rotor to a specific rotating angle, i.e. the detent torque, is reduced; (3) magnetic attraction is also generated between the permanent magnet and the intermediate magnetic substance in addition to the spaces between the permanent magnet and the stator yokes, whereby the former magnetic attraction functions so as to cancel or to alleviate the detent torque; and the like. In any case, it has been found out by the inventors that the intermediate magnetic substance is very effective for reducing the detent torque while not deteriorating the performance of the motor such as rotational torque.

In the above stepping motor, it is possible to rotatably support a plurality of gears for transmitting rotary movement of the motor so as to be freely rotatable on a supporting plate made of a magnetic substance, and to form the intermediate magnetic substance integrally on the supporting plate.

The above stepping motor is frequently constituted together with the plurality of gears for transmitting rotary movement of the motor. By forming the intermediate magnetic substance using the supporting plate for pivotally supporting the gears, it is possible to obtain the effect of reducing the detent torque without increasing the number of components, and also possible to position the gears and the intermediate magnetic substance in excellent accuracy and a productivity.

By incorporating the entire motor inclusive of the gears into an electrically insulative plastic casing and by forming the supporting plate with a magnetic material having a smaller coefficient of linear thermal expansion than that of the plastic casing, it is possible to solve various problems which occur along with use of the electrically insulative plastic casing such as lower accuracy, and to pursue noise reduction, cos: reduction and simplification of the structure of motor terminals.

Moreover, by forming at least one of the plurality of the shafts of the gears for transmitting the rotary movement of the rotor with a magnetic substance, and by forming the intermediate magnetic substance with a shaft of the former magnetic substance, it is possible to dispose the intermediate magnetic substance for obtaining the effect of reducing the detent torque without increasing the number of components.

Regarding the above stepping motor, it is preferable to set the width of a portion of the intermediate magnetic substance facing close to the magnetic pole-passing surface no thicker than half of the width of thickness of the magnetic pole-passing surface of the permanent magnet. From the findings of the inventors, it became clear that the effect of reduction in the detent torque varies depending on a positional relation between the magnetic pole-passing surface of the permanent magnet and the intermediate magnetic substance; however, the detent torque could be more effectively reduced by setting the width of the intermediate magnetic substance as described above.

As for the material of the intermediate magnetic substance, it is preferable to use a magnetic material having magnetic permeability no higher than the stator yokes. It is conceivable that the intermediate magnetic substance brings the effect of suppression of the detent torque by constituting an independent magnetic buffer between the two stator yokes. However, if the magnetic permeability of the intermediate magnetic substance is higher than necessary, then effective magnetic flux contributing to the rotational torque of the motor is collected more than necessary and there is also a risk of detent torque caused by magnetic attraction occurring toward the intermediate magnetic substance. It became clear that setting the magnetic permeability of the intermediate magnetic substance as described above is effective for avoidance of such a risk.

Arrangements of the magnetic poles and the like of the above stepping motor are preferably constituted in that: the permanent magnet includes three pairs of six magnetic poles; the two stator yokes, each being formed of a pair of two magnetic poles, are provided; the two stator yokes are provided in a manner that the both magnetic poles in each stator yoke are arranged to form an angle of 60 degrees; one of the magnetic poles of the first stator yoke and one of the magnetic poles of the second stator yoke are disposed to form an angle of 90 degrees; and the intermediate magnetic substance is disposed in a given position within the 90 degrees In the case of the stepping motor to be used for pointer driving of a pointer instrument, for example, it is known that the Constitution having the above-described magnetic-pole arrangements is effective for optimization of downsizing of the motor, improvement in rotational efficiency and the like. In this constitution, the intermediate magnetic substance can exert an excellent effect specifically in reduction of the detent torque.

By forming the magnetic-pole shapes of the stator yokes so as to face close to the magnetic pole-passing surface of the permanent magnet with equal spaces and in parallel, effective gap widths between the magnetic pole-passing surface of the permanent magnet and the magnetic poles formed on the stator yokes are optimized so as to secure a rotational torque performance attributable to the magnetic attraction acting between the both members.

Third principal means of the present invention is a stepping motor including a rotor including a permanent magnet having multiple poles magnetized to be reversed alternately along the circumferential direction, a stator yoke formed in a bent shape so that two ends thereof respectively constitute magnetic pole portions facing close to a magnetic pole-passing surface of the permanent, magnet, and a through-hole shaped winding bobbin on which an exciting coil for exciting the stator yoke is pre-wound, in which an intermediate portion of the stator yoke is inserted into the winding bobbin. Here, the stepping motor is characterized in that: the stator yoke is formed of a first yoke member to be inserted from one opening of the bobbin, and a second yoke member to be inserted from the other opening of the bobbin; respective inserting end portions of the both yoke members form a continuous magnetic path between the both members by joint portions contacting to each other by planes at least in an inserting direction and in an overlapping direction; and the joint portions are fixed by being pushed into the bobbin in a press-fit state.

According to the above-described means, it is possible to surely assemble the stator yoke inside the winding bobbin by a simple operation of inserting the pair of yoke members from both ends of the winding bobbin, without a process such as welding and without labor of stacking multiple members. Moreover, since the inserting end portions of the both yoke members contact to each other by planes in the two directions of the inserting direction and the overlapping direction, it is possible to obtain a good and stable magnetic connection between the both yoke members with low leakage of magnetic fields. Furthermore, since the joint portions are fixed inside the winding bobbin in the press-fit state, it is also possible to obtain a state of good and stable mechanical connection. In this way, it is possible to attain the object to provide the stepping motor excellent in the workability of assembly while improving the quality such as the magnetic characteristics of the stators or rust-proofing.

In the above stepping motor, if a protruded portion to be pressed to contact against an inner side face of the bobbin is provided on at least one of the inserting end portions of the first yoke member and of the second yoke member, then it is possible to enhance the workability upon assembling the stator yoke by inserting the yoke members into the winding bobbin.

In, the above stepping motor, if the protruded portion to be pressed to contact against the bobbin is provided on at least one of the inserting end portions of the first yoke member and of the second yoke member, and if a concave portion is provided on the bobbin side so as to allow the protruded portion to be retained in a state that the inserting end portions of the both yoke member are mutually joined to form the continuous magnetic path, then it is possible to further ensure the connection between the yoke members and the winding bobbin.

In the above stepping motor, if a pair of convex portion and concave portion, which mutually retain against movement in the inserting direction in the state that the inserting end portions of the both first and second yoke members are joined to each other to form the continuous magnetic path, are provided separately on the both yoke members, then it is possible to further ensure and stabilize the magnetic and mechanical connection between the yoke members.

Moreover, in the above stepping motor, if tapered portions being reduced in size toward the inserting direction are formed respectively on the inserting end portions of both of the first and second yoke members, then it is possible to further improve the workability of assembly of the stator yoke inside the winding bobbin.

The above stepping motor is suitable for the constitution in that at least two sets of the stator yokes are disposed on the outer periphery of the rotor to form multi-phase field magnet including two or more phases. A two-phase stepping motor using two stator yokes and exciting coils for one rotor is suitable for driving a pointer of a pointer instrument in two directions by open-loop control. However, as the two stator yokes are disposed therein, an assembly operation thereof tends to be complicated. On the contrary, according to the above-described means of the present invention, such an assembly operation can be performed efficiently and easily.

The stepping-motor is also suitable for the constitution in that the permanent magnet includes three pairs of (six) magnetic poles; two sets of the stator yokes, each being formed of a pair of (two) magnetic poles, are provided; the two stator yokes are provided in a manner that the both magnetic poles in each stator yoke are arranged to form an angle of 60 degrees; and one of the magnetic poles of the first stator yoke and one of the magnetic poles of the second stator yoke are disposed to form an angle of 90 degrees. In the case of the stepping motor to be used for pointer driving of a pointer instrument, for example, it is known that the constitution having the above-described magnetic-pole arrangements is effective for optimization of downsizing of the motor, improvement in rotational efficiency, and the like. To achieve this constitution, it is necessary that the magnetic pole portions on the both ends of the stator yoke are disposed accurately and stably. According to the above-described means of the present invention, it is possible to dispose the magnetic pole portions of the stator yoke accurately and stably.

BRIEF DESCRIPTION OF THE DRAWINGS

FIG. 4A shows a cross-sectional view taken along an a—a arrow line in FIG. 3, and FIG. 4B shows a cross-sectional view taken along a b—b arrow line in FIG. 4A, respectively;

BEST MODES FOR CARRYING OUT THE INVENTION (First Embodiment)

Figure 1:
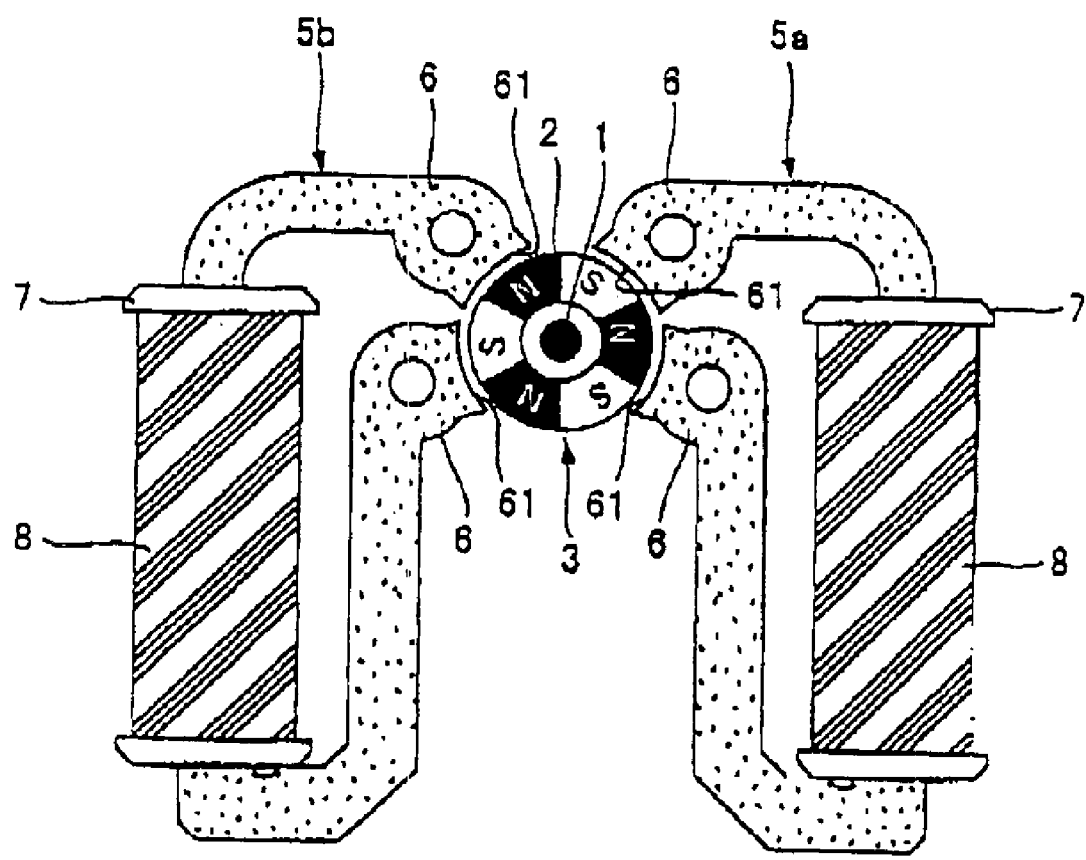
FIG. 1 is a plan view showing a first embodiment of a stepping motor according to the present invention.

FIG. 1 shows a first embodiment of a stepping motor according to the present invention. As shown in FIG. 1, in the stepping motor according to the first embodiment, a rotor 3 is formed by fitting a cylindrical permanent magnet 2 coaxially onto a rotating shaft 1. This permanent magnet 2 has multiple poles (six poles in the illustrated example) which are magnetized in a circumferential direction.

On the outside of the rotor 3, two stator yokes 5a and 5b are disposed. Each of the stator yokes 5a and 5b has an approximately U-shaped planar shape. Both tip portions of the stator yokes 5a and 5b respectively form pairs of magnetic pole end portions 6 and 6 called teeth, and the magnetic pole end portions 6 and 6 are disposed so as to face the magnetic poles formed on the outer peripheral surface of the permanent magnet 2.

The respective magnetic pole portions 6 and 6 of the stator yokes 5a and 5b are disposed on a common circumference having the rotating shaft has its center. A disposition space (a tooth angle) between the pair of magnetic pole end portions 6 and 6 formed by the both tip portions of one stator yoke is arranged to coincide with a magnetic pole pitch of the permanent magnet 2. In this embodiment, the magnetic pole pitch is set as 60 degrees. Therefore, the both tip portions of one of the stator yokes are positioned at both ends of a sector centering on the rotating shaft 1 with the center angle of 60 degrees. Moreover, the magnetic pole end portion 6 on one side of the stator yoke 5a and the adjacent magnetic pole end portion 6 on one side of the stator yoke 5b are disposed to form a phase difference by 90 degrees in terms of electric angle.

Winding bobbins 7 are fitted to the respective stator yokes 5a and 5b, and exciting coils 8 are wound around the respective bobbins 7. In this way, a two-phase type stepping motor is constituted in a manner that the stator yoke 5a side has a phase A and the stator yoke 5b side has a phase B. This stepping motor is formed as a salient-pole type, in which the magnetic pole end portions to be excited by the same phase are not disposed uniformly in the circumferential direction.

Figure 2:
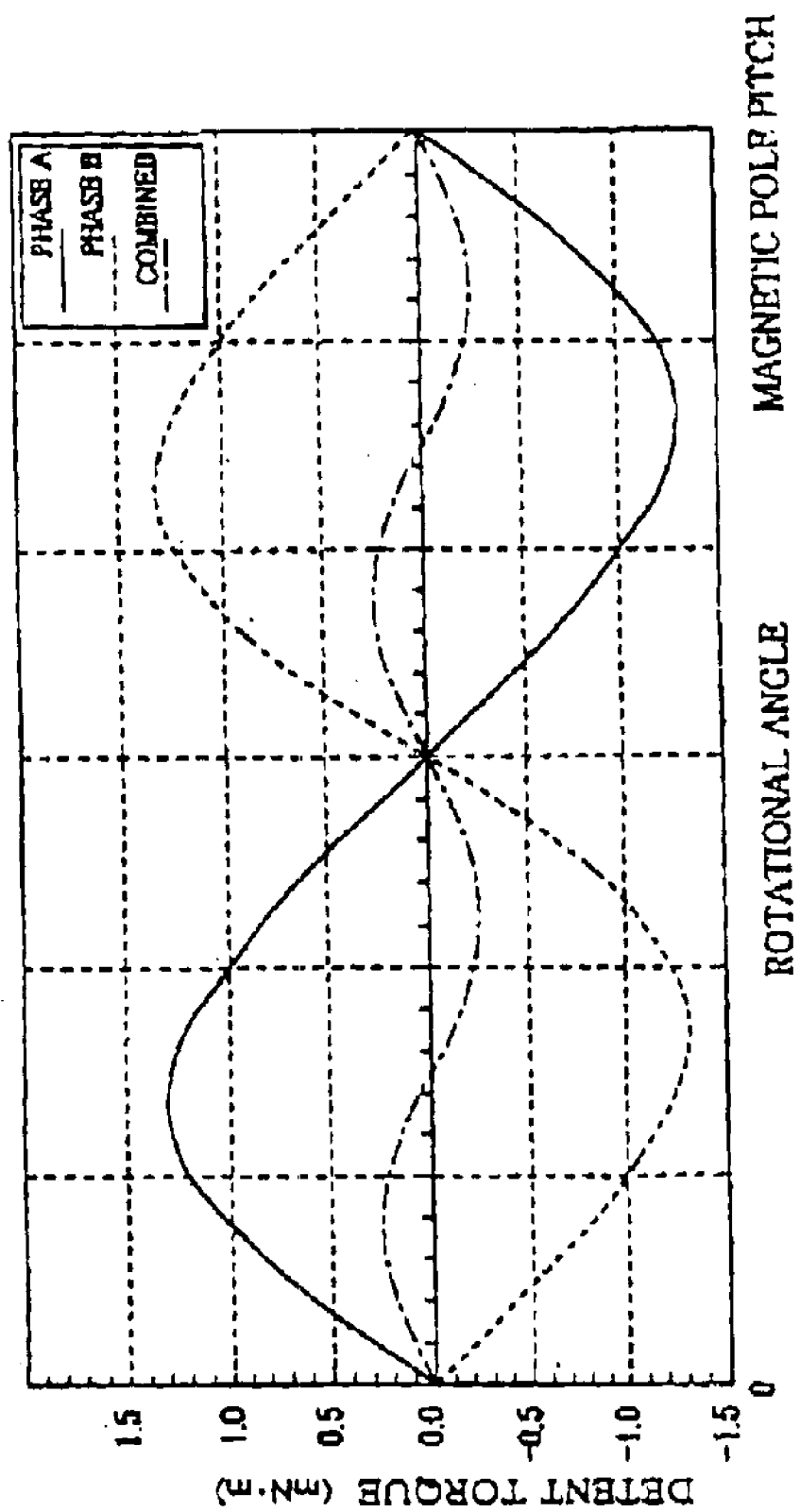
FIG. 2 is a graph for explaining detent torque of the stepping motor.

In this salient-pole type, rotation torque attributable to magnetic attraction is generated between the respective magnetic pole end portions 6 and the magnetic poles of the permanent magnet 2. In the illustrated example, the magnetic pole end portions 6 and 6 of the stator yoke 5a (the phase A) constitute the same pitch as the-magnetic pole pitch of the permanent magnet 2, and thus the torque in the same direction is generated. The magnetic pole end portion 6 of the stator yoke 5b (the phase B) is disposed so as to cause the phase difference of 90 degrees electrically to the magnetic pole end portion 6 of the stator yoke 5a. For this reason, there is the torque generated in the direction of magnetically canceling the torque generated at the magnetic pole end portion 6 of the stator yoke 5a. Then, the detent torque at the phase A and the detent torque at the phase B exhibit waveforms with respect to mechanical angles of movement as shown in FIG. 2. The detent torque on the whole stepping motor is equal to combination of the torque at the phase A and the torque at the phase B. As shown in FIG. 2, the combined torque exhibits a waveform having a double frequency as compared to the detent torque waveforms at the respective phases A and B.

Figure 3:
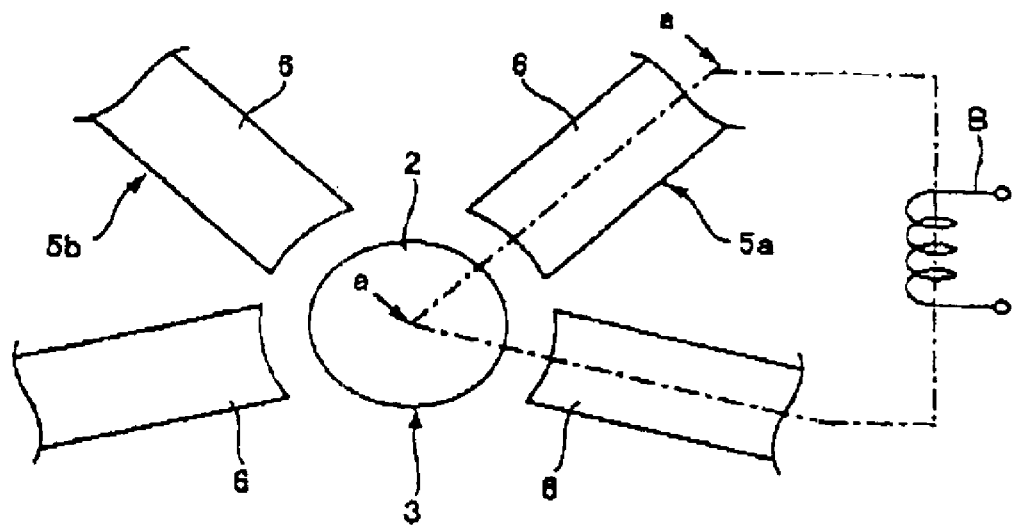
FIG. 3 is, at enlarged view showing major parts of the stepping motor according to the first embodiment of the present invention.
Figure 4A:
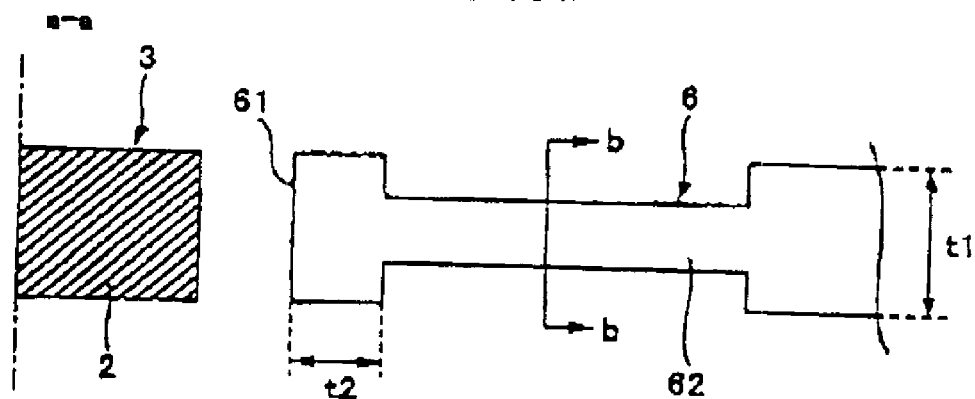
FIGS. 4A and 4B are views showing part of FIG. 3.
Figure 4B:
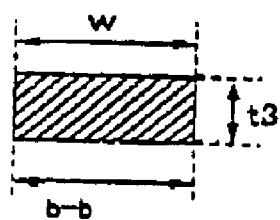

Here, in this embodiment, thinly-made thin portions 62 are provided in the positions close to the both ends of the stator yokes 5a and 5b, as shown in FIG. 3, FIG. 4A and FIG. 4B. FIG. 3 shows an enlarged view of the vicinity of the permanent magnet 2 and the magnetic pole end portions 6. FIG. 4A is a cross-sectional view taken along an a—a line in FIG. 3, and FIG. 4B is a cross-sectional view taken along a b—b line in FIG. 4A.

As shown in FIG. 4A, a magnetic pole surface 61, which is a tip surface of the magnetic pole end portion 6, is formed to have a thickness (height) t1 being approximately the same as a length (thickness) of the permanent magnet 2 in the axial direction. In a position going back from the magnetic pole surface 61 just by a predetermined distance t2, is formed the thin portion 62 as thinner than the magnetic pole surface 61. As shown in FIG. 4B, this thin portion 62 does not change by the width w, but is reduced in the thickness (height) t3 thereof, That is, the thin portion 62 is formed into a flattened rectangular shape in a cross section. On the contrary, the magnetic pole surface 61 has the same width was the thin portion 62, but is formed into a rectangular shape of which the thickness (height) t1 thereof is larger than that of the thin portion 62, (t3<t1).

In this way, the stator yokes 5a and 5b have the thin portions 62, of which the thicknesses are reduced short of the magnetic pole surfaces 61. The cross-sectional area of the thin portion 62 is made smaller than the area of the magnetic pole surface 61. The position of formation of this thin portion 62 is located at a position close to the magnetic pole surface 61 so as to satisfy t1>t2.

It is to be noted, in the illustrated example, that the thickness in the position further going back from the thin portion 62 is set as the same thickness t1 as the magnetic pole surface 61. However, the thickness in the position apart from the thin portion 62 does not necessarily have to be identical to the magnetic pole surface 61, and the thickness may be either thicker or thinner than t1. That is, thicknesses on both sides of the thin portion 62 may be equal or different. In short, it is satisfactory if a cross-sectional area of a magnetic path of the stator yoke 5a or 5b is sharply increased in front of the magnetic pole surface 61.

Figure 5:
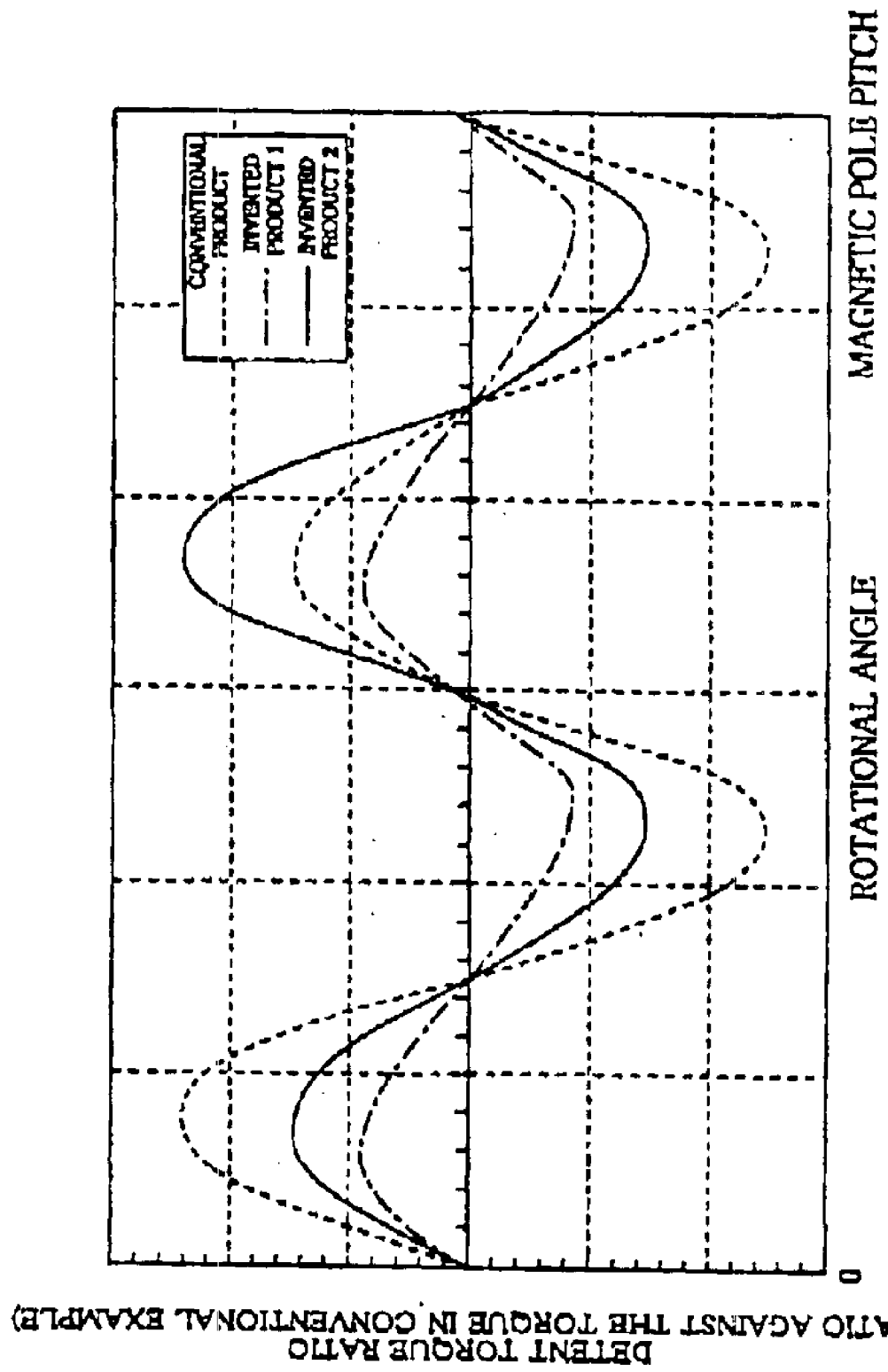
FIG. 5 is a graph showing an effect according to the first embodiment of the present invention.

By adopting the constitution as described above, the detent torque of the whole stepping motor formed by combining the detent torque generated at the two phase (A and B) emerges as shown with a dash-dot-dash line (an invented product 1) in FIG. 5. As for a conventional product of which stator yokes are entirely formed in uniform thicknesses, the detent torque emerges as shown with a dotted line (a conventional product) in the same graph.

As is apparent in FIG. 5, the product of the present invention can reduce the detent torque. In this way, it is possible to secure smooth rotary movement of the stepping motor. Such reduction in the detent torque is presumed to be due to the following reason. Specifically, magnetic resistance at the thin portion 62 becomes relatively greater as compared to magnetic resistant at the tip side of the magnetic pole end portion including the magnetic pole surface 61.

When the overall thickness is made uniform as in the prior art, the magnetic flux between the magnetic pole of the permanent magnet 2 and the magnetic pole surface 61 proceed almost in parallel on the whole. On the contrary, when the thin portion 62 is provided at a portion close to the inside of the magnetic pole surface 61 as in this invention, and at the time of comparing the magnetic flux approaching from the central portion of the magnetic pole surface 61 into the magnetic pole end portion 6 with the magnetic flux approaching from the position near the top or bottom end of the magnetic pole surface 61 into the magnetic pole end portion 6, then the former flows more easily. As a result, a magnetic field is formed in a space between the magnetic pole surface 61 and the magnetic pole of the permanent magnet 2 so as to focus the magnetic flux on to the central surface portion of the magnetic pole surface 61. That is, magnetic field strength distribution is generated, in which the magnetic field is strong at the central portion of the magnetic pole surface 61 and becomes weak in the periphery thereof. Accordingly, it is conceivable that the detent torque is weakened because of this magnetic field strength distribution.

Figure 6A:
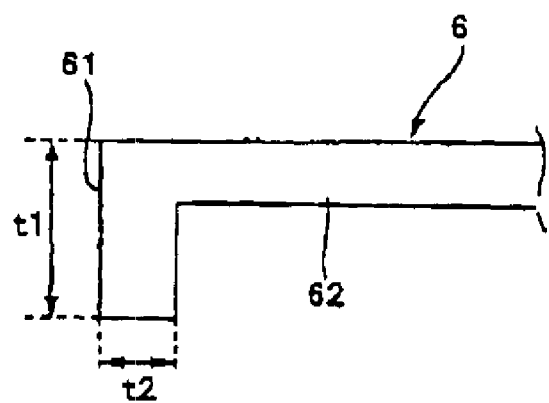
FIGS. 6A and 6B are enlarged views of major parts showing another example of the first embodiment of the present invention.
Figure 6B:
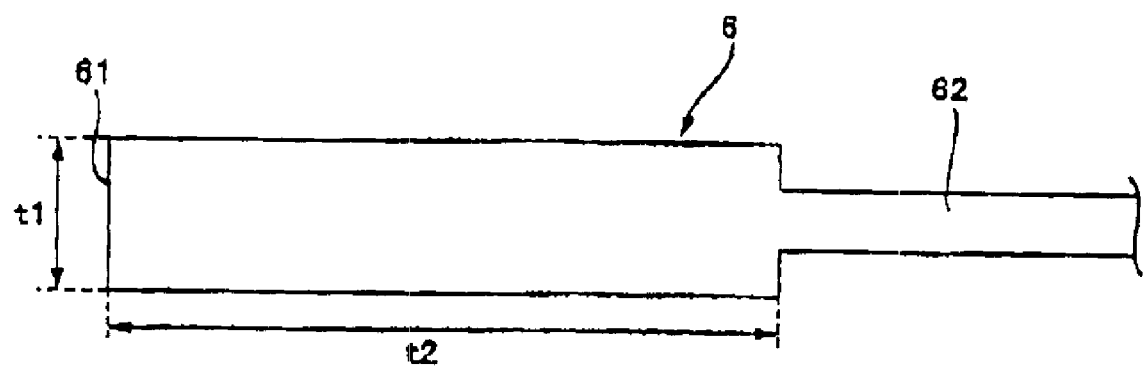

FIGS. 6A and 6B show another example concerning the thin portion 62. In the example shown in FIG. 4, the thin portion 62 is positioned in the center of thickness of the magnetic pole surface 61. However, in addition to this example, the present invention may be embodied in a manner that the thin portion 62 is positioned on one side (on an upper side in the illustrated example) of the magnetic pole surface 61. Such a shape is easily obtainable by forming the magnetic pole surface 61 by bending the tip portion of the magnetic pole end portion 6.

Specifically, a thinning process on the magnetic pole end portion 6 such as cutting out both side portions in the thickness direction is required to form the thin portion 62 into the shape as shown in FIG. 4. However, the shape as shown in FIG. 6A is easily available by a bending process on the magnetic pole end portion 6. In this case, the thickness (t1) of the magnetic pole surface 61 can be set easily and freely depending on the bending position of the magnetic pole end portion 6. Moreover, such bending can be performed easily and efficiently by a press machine and the like. In this way, it is possible to facilitate manufacturing.

In this case, the whole stator yoke except the tip portions may be formed thinly and the magnetic pole surface 61 may be formed by bending the both tip portions. Alternatively, the central portion of the stator yoke may be formed thinly as similar to the magnetic pole surface 61.

In the above-described constitution, the thin portion 62 is provided at the position relatively close to the magnetic pole surface 61. However, as shown in FIG. 6B, it is also possible to set a distance t2 from the magnetic pole surface 61 to the thin portion 62 longer than the thickness t1 of the magnetic pole surface 61.

In the case of constitution as shown in FIG. 6B, the overall detent torque of the stepping motor turns out to be equivalent to a solid line (an invented product 2) in FIG. 5. In this case, although the detent torque becomes larger as compared to the stepping motor provided with the thin portion 62 at the position close to the magnetic pole surface 61, it is confirmed that the detent torque is fairly reducible as compared to the conventional example.

Figure 7:
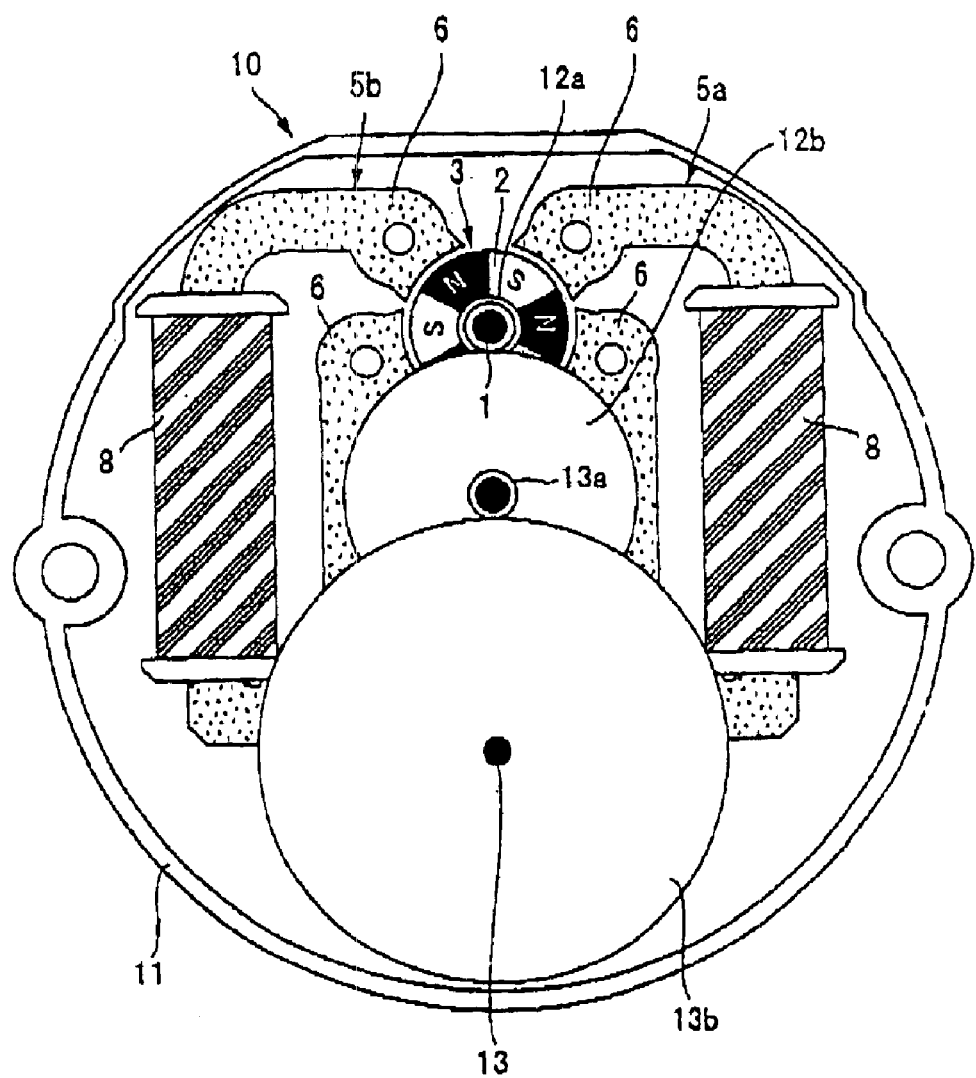
FIG. 7 is a plan view showing a preferred embodiment of a geared motor according to the present invention.

FIG. 7 shows a preferred embodiment of a geared motor according to the present invention. The geared motor can be constituted by incorporating the above-described stepping motor into a casing together with a deceleration mechanism. As for the deceleration mechanism, an assortment of a pinion being a small-diameter gear and another gear being a large-diameter gearwheel is used.

Figure 8:
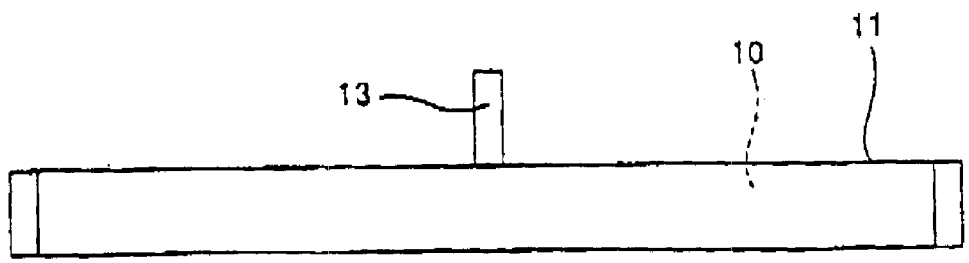
FIG. 8 is a side view of the geared motor shown in FIG. 8.

In the same drawing, reference numeral 10 denotes the above-described stepping motor. Components of the stepping motor 10 are embedded and arranged inside a flat plastic casing 11. A first pinion 12a, which is supported rotatably, is fitted to a shaft 1. A first gearwheel 12b is provided so as to be engaged with the first pinion 12a. Torque of the first gearwheel 12b is transmitted to a second gearwheel 13b via a second pinion 13a. In this way, rotation of the rotor 3 is serially transmitted through the first pinion 12a, the first gearwheel 12b, the second pinion 13a, and the second gearwheel 13b and thereby reduced in speed and increased in power. Such rotation being reduced in speed and increased in power can be taken out of a rotating shaft 13 of the second gearwheel 13b protruding toward the outside of the casing 11 as shown in FIG. 8. In this case, the rotating shaft 13 of the second gearwheel 13b constitutes a rotational output shaft of the geared motor. A ratio of revolutions of the output shaft 13 to the revolutions of the rotor. 3 can be arbitrarily set in accordance with respective gear ratios between the pinions 12a and 13a, and the gearwheels 12b and 13b.

Since the above-described stepping motor causes small detent torque, the output-shaft 13 can be smoothly rotated and stopped in a given angular position by applying exciting currents to the respective exciting coils 3 by given timing. Moreover, geared motor is applicable to an on-board pointer instrument by fitting the pointer and the like of the pointer instrument to this output shaft 13 directly or through other power transmitting means, As described above, in the stepping motor and the geared motor according to the first embodiment of the present invention, the cross-sectional areas of given regions of the stator yokes constituting the magnetic path are reduced less than the areas of the magnetic pole surfaces located on the both ends of the stator yokes. Hence it is possible to reduce the detent torque of the overall stepping motor. In this way, smooth rotary movement becomes feasible.

(Second Embodiment)

Figure 9:
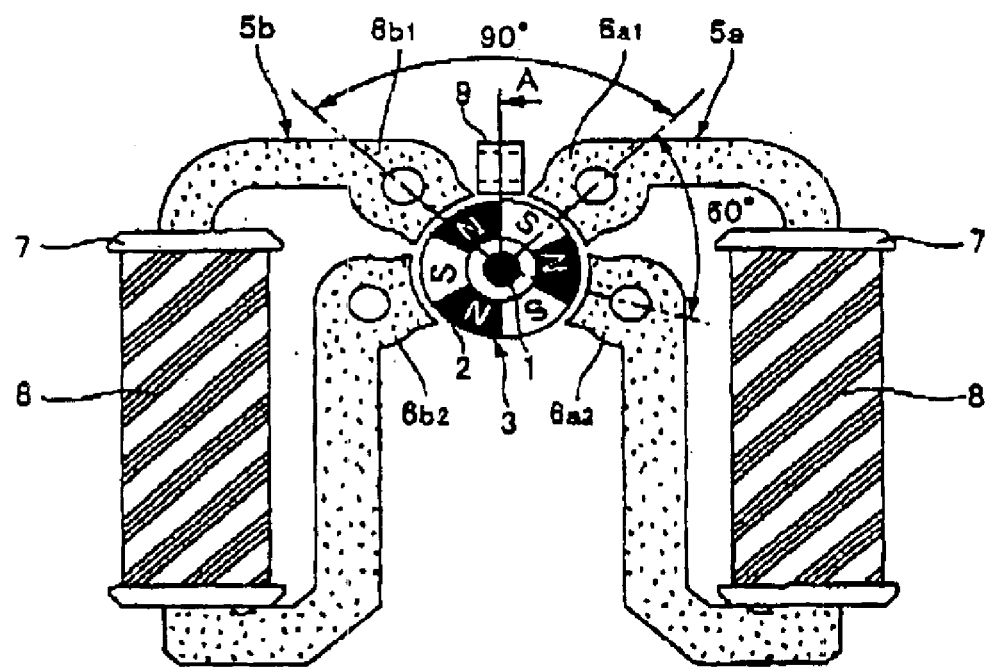
FIG. 9 is a plan view showing a second embodiment of the stepping motor according to the present invention.

FIG. 9 shows a second embodiment of the stepping motor according to the present invention. To begin with, in the stepping motor shown in the drawing, a rotor 3 is formed by an annular permanent magnet 2 fitted coaxially to a rotating shaft 1 as similar to the above-described first embodiment. The permanent magnet 2 is formed of multiple poles magnetized to be reversed alternately by 60-degree pitches along the circumferential direction, thus including three pairs of (six) magnetic poles (i.e. three pole pairs). Two stator yokes 5a and 5b are disposed outside this rotor 3.

The respective stator yokes 5a and 5b respectively have approximately U-shaped planar shapes, and both tips of the U-shapes are formed as magnetic pole portions 6a1, 6a2, 6b1, and 6b2. The two stator yokes 5a and 5b have the planar shapes identical to each other and are disposed symmetrically on the right and the left sides so that the magnetic pole portions 6a1, 6a2, 6b1, and 6b2 face close to a magnetic pole-passing surface of the permanent magnet 2.

Tip surfaces of the respective the magnetic pole portions 6a1, 6a2, 6b1, and 6b2 are respectively formed into arc shapes located on a concentric circle so as to face close with equal spaces and in parallel to an outer peripheral surface, that is, the magnetic pole-passing surface of the permanent magnet 2. The magnetic poles 6$a$1 and 6$a$2, and the magnetic poles 6$b$1 and 6$b$2 are respectively disposed so as to be positioned on both ends of an arc of a section with a central angle of 60 degrees centering on the rotating shaft 1, in order to coincide with the magnetic pole pitch of the permanent magnet 2. Moreover, the magnetic pole 6$a$1 and the magnetic pole 6$b$1 are disposed so as to be positioned on both ends of an arc of a section with a central angle of 90 degrees centering on the rotating shaft 1, in order to cause a phase difference at an electrical angle of 90 degrees.

A bobbin 7 is fitted to one of the U-shaped leg pair of each stator yoke 5$a$ or 5$b$. An exciting coil 8 is pre-wound on this bobbin 7. In this way, formed is a two-phase salient-pole type stepping motor in which one stator yoke 5$a$ (or 5$b$) side is set to a phase A and the other stator yoke 5$b$ (or 5$a$) side is set to a phase B.

Moreover, in a precisely middle position between the magnetic poles 6$a$1 and 6$b$2 of the two adjacent stator yokes 5$a$ and 5$b$, is disposed an intermediate magnetic substance 9 which is set independently without contacting magnetically to any of the two stator yokes 5$a$ and 5$b$ (although the intermediate magnetic substance may contact physically thereto). This intermediate magnetic substance 9 suppresses occurrence of detent torque attributable to magnetic influences from the stator yokes 5$a$ and 5$b$.

Figure 10A:
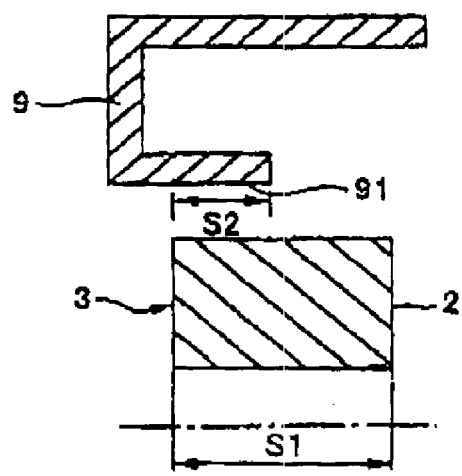
FIGS. 10A and 10B are detailed cross-sectional views in the vicinity of an intermediate magnetic substance provided on the motor shown in FIG. 9.
Figure 10B:
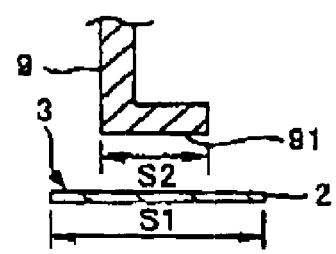

FIGS. 10A and 10B show detailed cross-sectional views of the vicinity of the intermediate magnetic substance 9. Of the drawings, FIG. 10A shows a cross section-from the A direction (arrow) in FIG. 1. The intermediate magnetic substance 9 is formed by bending a thin rectangular magnetic steel piece into a deformed U-shape having a pair of leg portions with different lengths. An outer side face of the shorter leg portion constitutes a magnetically active surface 91 which faces close to the magnetic pole-passing surface of the permanent magnet 2. This magnetically active surface 91 is allowed to face close and in parallel to the magnetic pole-passing surface in an upright state in a thickness direction (a height direction) of the magnetic pole-passing surface of the permanent magnet 2.

In addition, the magnetically active surface 91 is positioned so as to overlap the thickness s1 of the magnetic pole-passing surface of the permanent magnet 2 along the direction of thickness (the height direction) just by a width s2, which is no greater than ½ of the thickness s1 (s2≦s1/2). That is, the magnetically active surface 91 is constituted in a manner that the width s2 of the portion where the intermediate magnetic substance 9 faces close to the magnetic pole-passing surface is set no greater than ½ of the thickness s1 of the magnetic pole-passing surface of the permanent magnet 2. Note that it is more preferable here to set the width s2 no larger than ½. However, such preference does not impede the width s2 from being set larger than the thickness s1 of the magnetic pole-passing surface. That is, an aspect of setting the width s2 greater than the width s5 is also feasible.

FIG. 10B shows another example of a positional relation between the intermediate magnetic substance 9 and the permanent magnet 2. In this case, the width s2 of the portion where the intermediate magnetic substance 9 faces close to the magnetic pole-passing surface is also constituted to be set no larger than ½ of the thickness s1 of the magnetic pole-passing surface of the permanent magnet 2.

Figure 11:
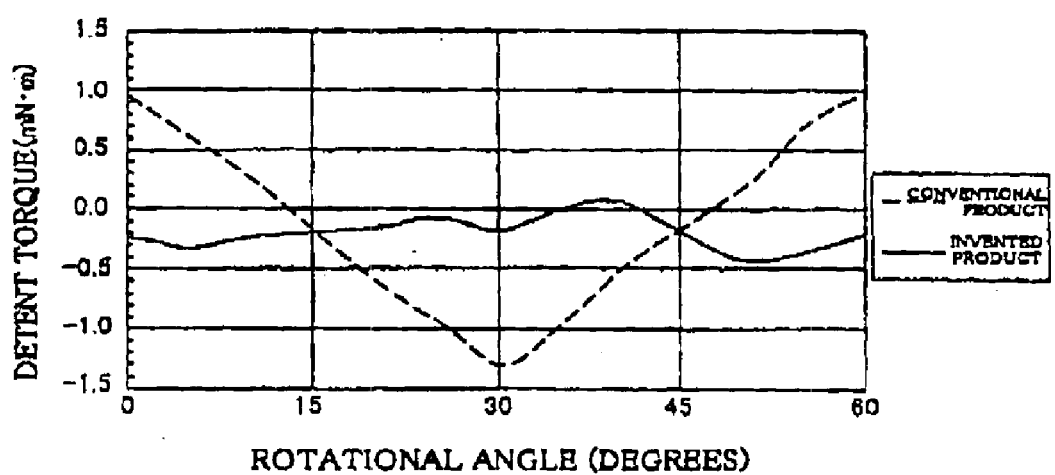
FIG. 11 is a graph showing detent torque characteristics of the stepping motor according to the second embodiment of the present invention.

FIG. 11 is a graph showing detent torque characteristics of the above-described stepping motor. In the graph, a characteristic curve with a solid line shows a state of change in detent torque with respect to a rotational angle when the intermediate magnetic substance 9 is provided, and a characteristic curve with a dotted line shows a state of change in the detent torque with respect to the rotational angle when the intermediate magnetic substance 9 is not provided.

As it is apparent in the comparative graph, variation of the detent torque depending on the rotational angle of the permanent magnet is greatly reduced in the case of providing the intermediate magnetic substance 9 (the solid line) as compared to the opposite case (the dotted line) Note that the detent torque on the ordinate in the characteristic graph shows the torque at the rotational output shaft being decelerated by the gears.

Figure 12:
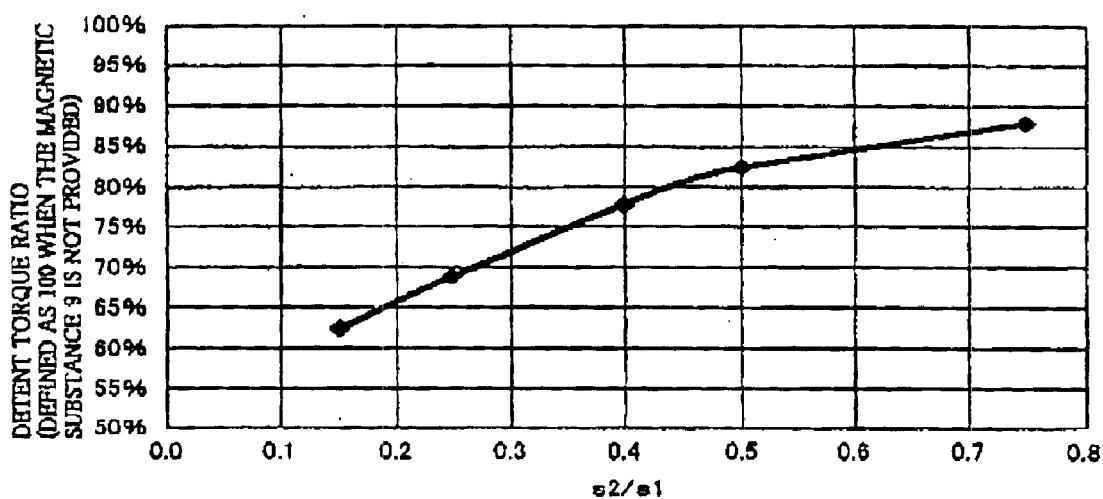
FIG. 12 is a graph showing a relation between a close facing state of a permanent magnet and the intermediate magnetic substance, and an effect of reduction in detent torque.

FIG. 12 is a graph showing a relation between an effect of reduction in the detent torque and a close facing state prepared by the permanent magnet and the intermediate magnetic substance. In the graph, the abscissa indicates a ratio of a closely facing width s2 of the intermediate magnetic substance to the width of the thickness s1 of the permanent magnet (s2/s1), The ordinate indicates magnitude of a detent torque ratio (a variation range of the detent torque depending on the rotational angle) by use of a relative value which is defined as 100% when the intermediate magnetic substance is not provided.

As shown in the graph, the detent torque ratio is apparently reduced by provision of the intermediate magnetic substance 9. The effect of such reduction becomes more conspicuous when the ratio of the close facing width s2 of the intermediate magnetic substance 9 to the width of the thickness s1 of the permanent magnet 2 (s2/s1) is reduced to some extent. Particularly, it is perceived that the effect of reduction in the detent torque becomes conspicuous when the ratio (s2/s1) becomes 0.5 or lower, that is, when the close facing width s2 of the intermediate magnetic substance 9 becomes ½ or less than the width of the thickness s1 of the permanent magnet 2 (s2/s1).

Table 1 shows a difference in the detent torque ratio depending on the material of the intermediate magnetic substance.

TABLE 1

Detent torque ratio depending on the material of the intermediate magnetic substance

| Material of the magnetic substance 9 | SUY | SUS |
|---|---|---|
| Magnetic annealing | Treated | None |
| Detent torque ratio | 100 | 92 |

In Table 1, SUY denotes electromagnetic soft iron which is frequently used for the stator yokes and the like, which was magnetically annealed after formation into the shape of the intermediate magnetic substance 9. This material exhibits relatively high magnetic permeability. SUS denotes electromagnetic stainless steel, which was not magnetically annealed after formation into the shape of the intermediate magnetic substance 9. This material exhibits lower magnetic permeability than the SUY.

As it is perceived from Table 1, it is effective for reduction of the detent torque to use the magnetic material which has the magnetic permeability no higher than the stator yoke, as the material of the intermediate magnetic substance 9.

Figure 13:
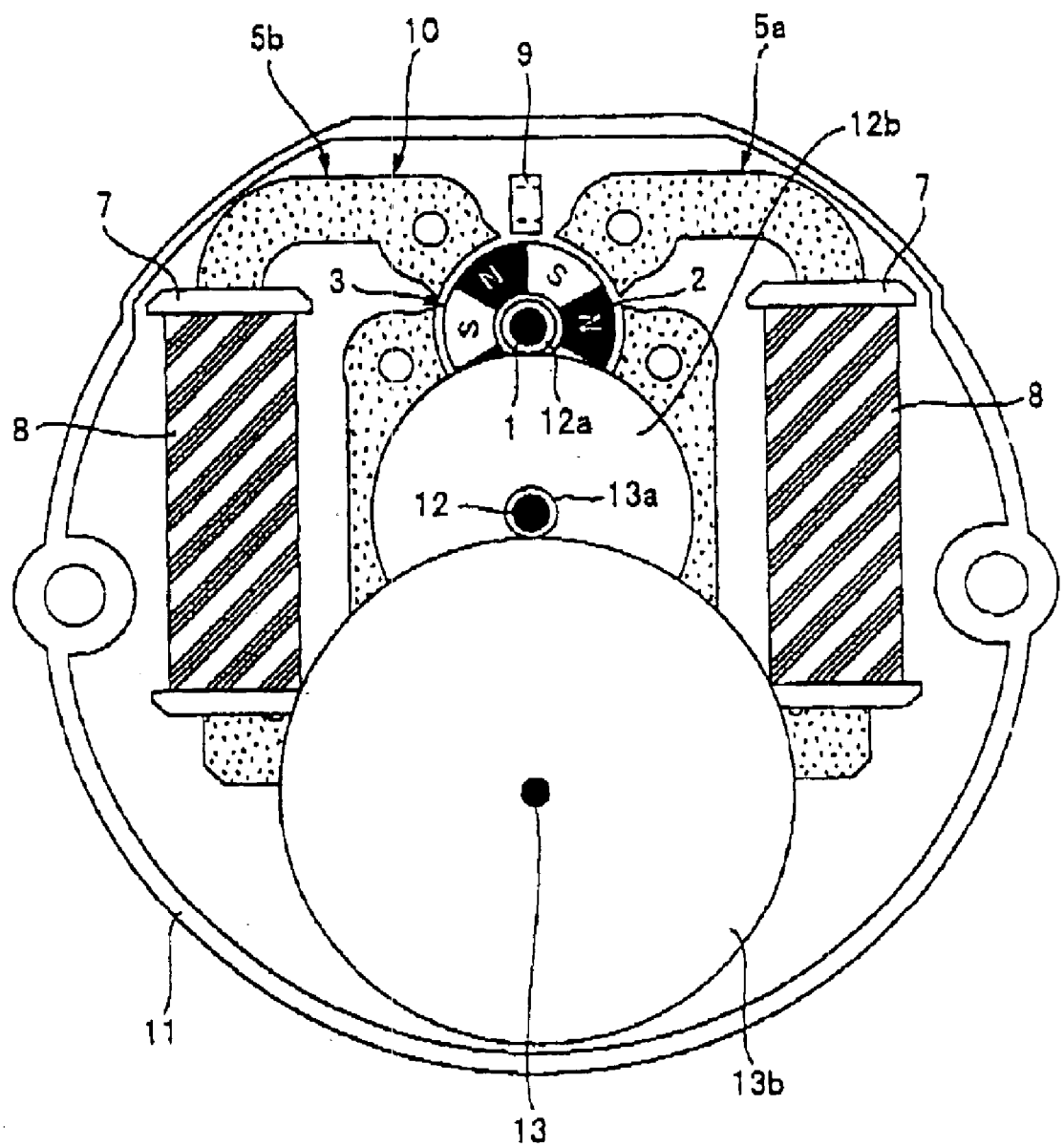
FIG. 13 is a top side view of the inside of a casing, which shows a state of incorporating the stepping motor according to the second embodiment of the present invention into a plastic casing.

FIG. 13 is a top side view inside a casing, which shows a state of incorporating the stepping motor according to the second embodiment of the present invention into an electric insulative plastic casing together with deceleration gears. In the drawing, a rotational output of a stepping motor 10 is taken out of a gear 12$a$ of the rotor 3 integrated to the permanent magnet 2 (when the shaft is fixed and only the integrated permanent magnet 2 and the gear 12a are rotated). Rotation of the motor 10 is reduced in speed and transmitted by a first pinion 12a integrated to the rotor 3, a first gearwheel 12b engaged with this first pinion 12a, a second pinion 13a integrated coaxially to this first gearwheel 12b, and a second gearwheel 13b engaged with this second pinion 13a, and is finally taken out of a rotating shaft 13 of the second gearwheel 13b.

Figure 14:
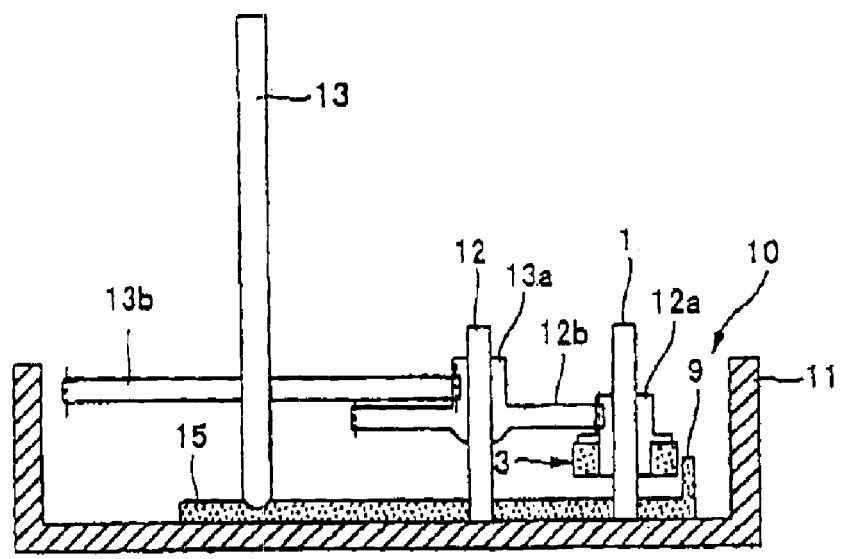
FIG. 14 is a cross-sectional view of major parts of the geared stepping motor shown in FIG. 13.

FIG. 14 is a cross-sectional view of major parts of the geared stepping motor shown in FIG. 13. As shown in the drawing, respective rotating shafts 1, 12, and 13 of a plurality of gears (the pinions 12a and 13a, and the gearwheels 12b and 13b) for transmitting rotary movement of the rotor 3 (the permanent magnet 2) are supported as freely rotatable on a supporting plate 15 made of a magnetic substance. Moreover, the intermediate magnetic substance 9 is unitarily formed with this supporting plate 15 by partially bending the supporting plate 15 by use of a press machine or the like. Then, the entire motor including the supporting plate 15 and the gears (12a, 12b, 13a, and 13b) are incorporated in an electrically insulative plastic casing 11. The supporting plate 15 is made of a magnetic material having a smaller coefficient of linear thermal expansion than that of the plastic casing 11.

With the above-described constitution, it is possible to solve various problems which occur along with use of the plastic casing 11, for example, degradation of accuracy such as a deviation of inter-gear distances caused by temperature change. The constitution is advantageous to noise reduction, cost reduction and simplification of the structure of motor terminals. Moreover, it is possible to surely obtain smooth and stable rotating operations.

Figure 15:
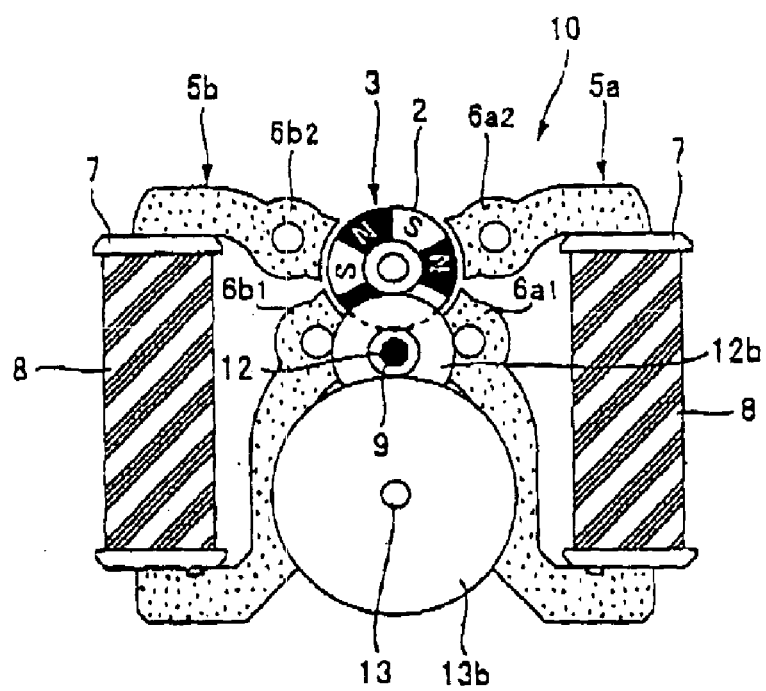
FIG. 15 is a top side view showing another example of the second embodiment of the present invention.

FIG. 15 is a top side view showing another example concerning the intermediate magnetic substance 9. In this example, disposition arrangement of the stator yokes 5a and 5b is replaced with each other as compared to the illustration in FIG. 9 or FIG. 13. Moreover, in this example, the rotating shaft 12 of at least one gear among the plurality of gears (12a, 12b, 13a, and 13b) for transmitting the rotary movement of the rotor 3 is made of a magnetic substance, and the intermediate magnetic substance 9 is formed by use of a shaft 12 of this magnetic substance. That is, the shaft 12 of the gears (12b and 13a) and the intermediate magnetic substance 9 are constituted by one common part. According to this constitution, it is possible to dispose the intermediate magnetic substance 9 for obtaining the effect of reduction in the detent torque without increasing the number of components.

As described above, the second embodiment of the present invention is the stepping motor comprising the rotor including the permanent magnet having multiple poles magnetized to be reversed alternately along the circumferential direction, two or more stator yokes being disposed on the outer periphery of this rotor for forming multi-phase field magnet having two or more phases, and the exciting coils for exciting the stator yokes, in which the magnetic pole portions of the stator yokes are disposed so as to face close to the magnetic pole-passing surface of the permanent magnet, wherein the intermediate magnetic substance magnetically independent of the stator yokes on both sides thereof is disposed in a given position between the two adjacent stator yokes for facing close to the magnetic pole-passing surface of the permanent magnet. Accordingly, it is possible to obtain a smooth rotational output by effectively reducing the detent torque that causes torque ripple to the rotational output without substantially deteriorating motor performances such as the rotational torque.

Moreover, it is possible to solve various problems which occur along with use of the electrically insulative plastic casing such as degradation of accuracy. The embodiment is advantageous to noise reduction, cost reduction and simplification of the structure of feeding terminals. Moreover, it is possible to seek an effect of surely obtaining smooth and stable rotating operations.

(Third Embodiment)

Figure 16A:
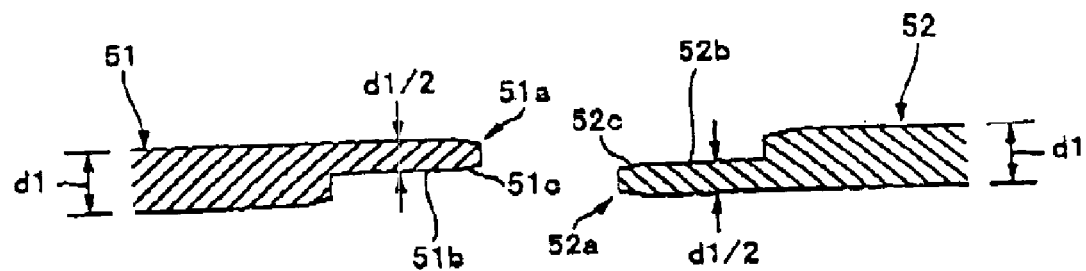
FIGS. 16A to 16C are sectional side elevations showing an example of stator yoke portions of a stepping motor according to a third embodiment of the present invention.
Figure 16B:
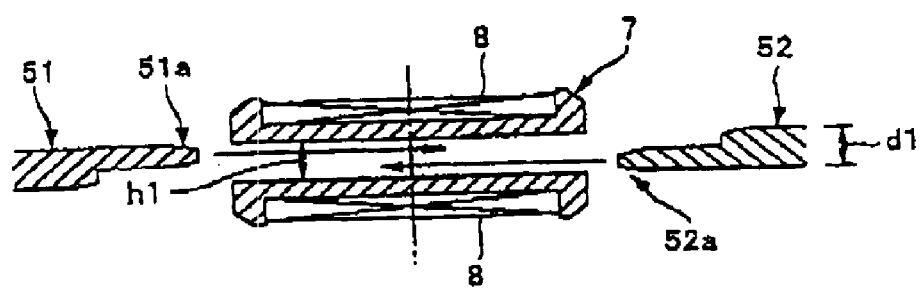
Figure 16C:
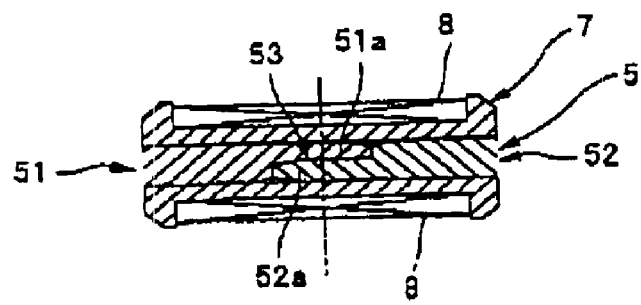

The three drawings in FIG. 16 show a third embodiment of the stepping motor according to the present invention. The drawings show sectional side elevations of major parts of stator yokes to be used in this embodiment. Of the drawings, FIG. 16A shows yoke members 51 and 52 before assembling a stator yoke 5. FIG. 16B shows a state before assembling the yoke members 51 and 52 into the stator yoke 5 inside a winding bobbin 7, and FIG. 16C shows a state of forming the stator yoke 5 which is magnetically integrated by being connected inside the winding bobbin 7, respectively.

As shown in the drawings, the stator yoke 5 is formed of a first yoke member 51 to be inserted from one opening (the left side in the drawings) of a through-hole shaped winding bobbin 7 on which an exciting coil 8 is pre-wound, and a second yoke member 52 to be inserted from the other opening (the right side in the drawings) of the bobbin 7. L-shaped cut-out portions 51b and 52b for forming thickness gaps are provided on respective tip portions of inserting end portions 51a and 52a of the both yoke members 51 and 52.

These cut-out portions 51b and 52b are formed as complementary shapes which are symmetrical to each other, and constitute a joint portion 53 for forming a continuous magnetic path between the both members by allowing the respective inserting end portions 51a and 52a of the both yoke members 51 and 52 to contact to each other both in an inserting direction thereof (the horizontal direction in the drawings) and in an overlapping direction (the vertical direction in the drawings) The joint portion 53 is fixed inside the winding bobbin 7 in a press-fit state.

The both yoke members 51 and 52 have constant rectangular cross-sectional shapes mutually provided with a given thickness d1. Meanwhile, the thickness d1 is halved in the cut-out portions 51b and 52b (d1/2). That is, the thickness d1 in the cut-out portions 51b and 52b are set so as to achieve the uniform thickness in the entire stator yoke 5.

On the contrary, the through-hole shaped winding bobbin 7 has a tubular hollow of a constant rectangular cross-sectional shape to allow the yoke members 51 and 52 to be inserted in a given positioning condition, and a height of the hollow (a height corresponding to the thickness d1) h1 is set slightly smaller than the thickness d1 (=d1/2+d1/2) at the joint portions 53 within the range where elastic stress works effectively between the winding bobbin 7 and the joint portions 53 (h1<d1). In this way, the both yoke members 51 and 52 are inserted into the winding bobbin 7 in a press-fit state, and thereby retained and fixed together.

According to the above-described constitution, it is possible to assemble the stator yoke 5 surely inside the winding bobbin 7 by a simple operation of inserting the pair of yoke members 51 and 52 from both ends of the winding bobbin 7 without labor of stacking multiple members. At the same time, it is possible to form a state of good and stable magnetic connection between the both yoke members 51 and 52 with low leakage of magnetic fields, by allowing the inserting end portions 51a and 52a of the both yoke members 51 and 52 to keep plane-contact to each other in the both directions of the inserting direction and the overlapping direction. Furthermore, since the joint portion 53 is fixed inside the winding bobbin 7 in the press-fit state, it is possible to obtain a state of good and stable mechanical connection. In this way, it is possible to attain the object to provide the stepping motor excellent in the workability of assembly while improving the quality such as the magnetic characteristics of the stators or rust-proofing.

Furthermore, in the illustrated example, taper portions 51c and 52c, which are reduced in the thickness toward the inserting direction, are formed respectively at the inserting end portion 51a and 52a of the yoke members 51 and 52. In this way, it is possible to considerably improve the workability in inserting the yoke members 51 and 52 into the winding bobbin 7 upon assembly of the stator yoke 5 inside the winding bobbin 7.

Figure 17A:
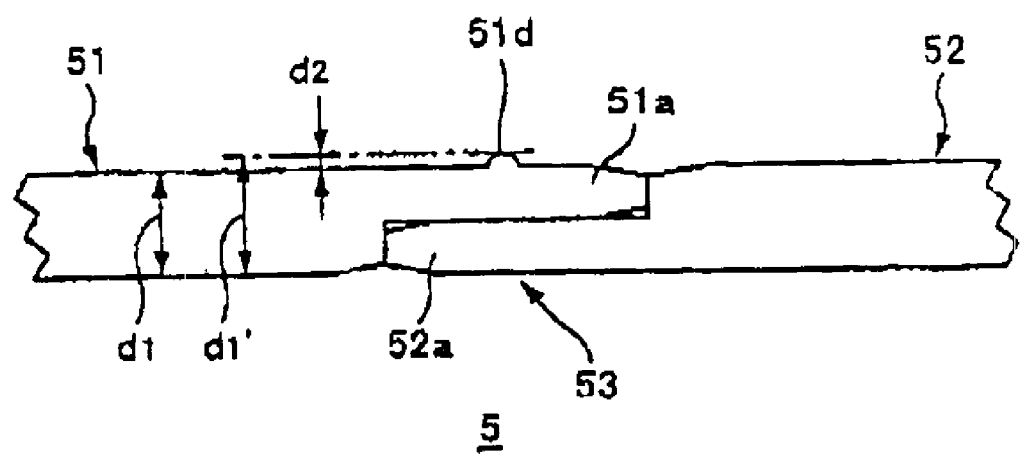
FIGS. 17A and 17B are sectional side elevations showing another example of the stator yoke portions of the stepping motor according to the third embodiment of the present invention.

The drawings in FIG. 17 show major parts of another example of the stator yoke. Description will be made herein by focusing on the difference to the foregoing example. First, in FIG. 17A, the inserting end portion 51a of the yoke member 51 is provided with a protruded portion 51d to be pressed against an inner surface of the winding bobbin X, In this case, an aggregate thickness d1'(=d1+d2) of the joint portion 53 with addition of a height d2 of this protruded portion 51d is set slightly higher than the height h1 of the hollow inside the winding bobbin 7 (d1+d2>h1).

With this constitution, it is possible to fix the both yoke members 51 and 52 inside the winding bobbin 7 in the press-fit state, and to make insertion of the both yoke members 51 and 52 into the winding bobbin 7 easier. That is, the aggregate thickness (d1/2+d1/2) of the inserting end portions 51a and 52a except the portion of the protruding portion 51d can be set about the same as or slightly smaller than the height h1 of the hollow inside the winding bobbin 7. In this way, it is possible to make insertion of the inserting end portions 51a and 52a into the winding bobbin 7 easier. Therefore, in this example, it is possible to enhance the workability upon assembling the stator yoke 5 by inserting the yoke members 51 and 52 into the winding bobbin 7 while securing a pressed and fixed state of the stator yoke 5 inside the winding bobbin 7. Moreover, it is also possible to reduce chips scraped off when the yoke rubs the bobbin. In this way, it is possible to enhance the quality by reducing defects of the motor attributable to dirt and the like.

Figure 17B:
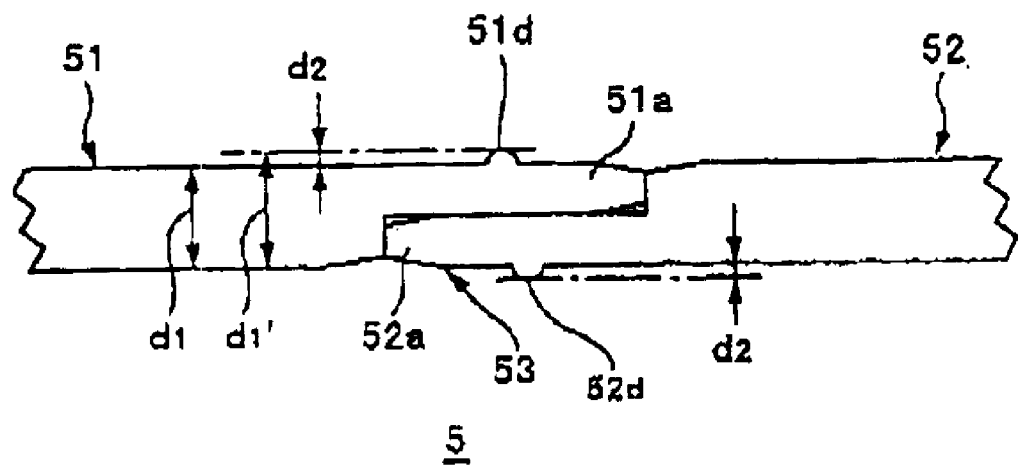

FIG. 17B shows an example in which protruded portions 51d and 52d are provided respectively on the two yoke members 51 and 52. In this case, the aggregate thickness d1'(=d1+2×d2) of the joint portion 53 with addition of both heights d2 and d2 of the respective protruded portions 51d and 52d is set slightly higher than the height h1 of the hollow inside the winding bobbin 7 (d1+2×d2>h1). In this way, as similar to the foregoing case, it is possible to enhance the workability upon assembling the stator yoke 5 by inserting the yoke members 51 and 52 into the winding bobbin 7 while securing the pressed and fixed state of the stator yoke 5 inside the winding bobbin 7.

Figure 18:
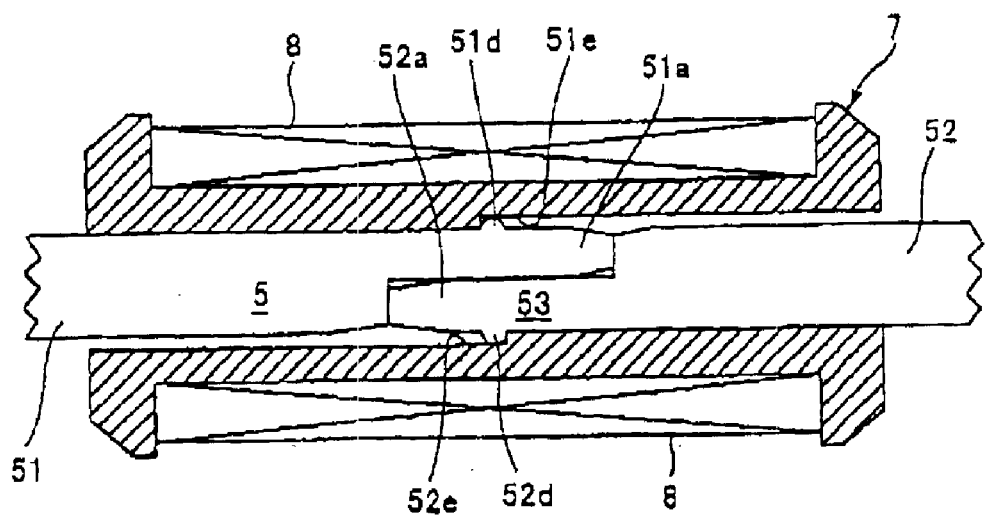
FIG. 18 is a sectional side elevation showing an example of a stator yoke and a winding bobbin portion of the stepping motor according to the third embodiment of the present invention.

FIG. 18 shows another example concerning the stator yoke and the winding bobbin. In the example illustrated in the drawing, the protruded portions 51d and 52d for being pressed against the inner surface of the winding bobbin 7 are severally provided on the respective inserting end portions 51a and 52a of both the yoke members 51 and 52, and concave portions 51e and 52e for allowing the protruded portions 51d and 52d to be inserted and retained are provided inside on the winding bobbin 7 side.

These concave portions 51e and 52e, allow the protruded portions 51d and 52d to be stably retained inside the winding bobbin 7 in a state of forming a continuous magnetic path by a mutual junction of the inserting end portions 51a and 51b of both the yoke members 51 and 52. In this way, it is possible to further ensure the junction between the yoke members 51 and 52 and the winding bobbin 7. If the protruded portion 51d is provided only on the yoke member 51 side as shown in FIG. 17A, only the concave portions 51e may be provided for allowing insertion and retention of the protruded portion 51d.

Figure 19:
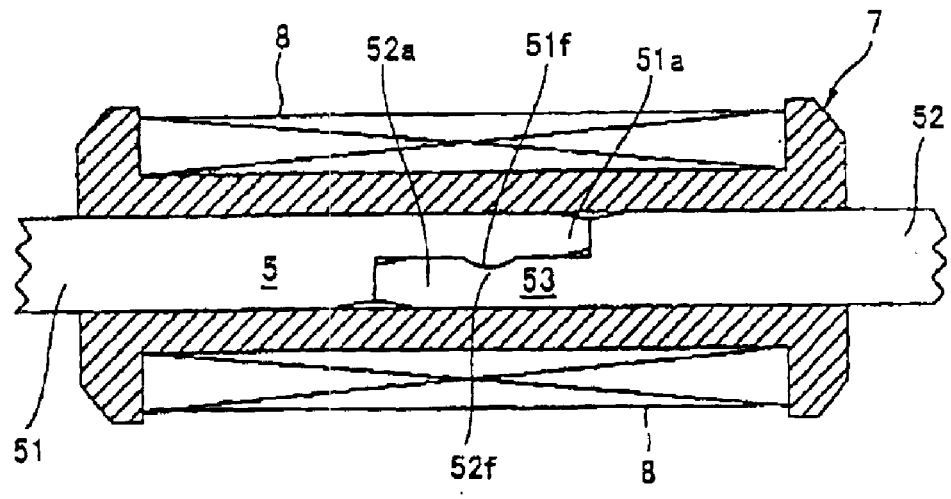
FIG. 19 is a sectional side elevation showing another example of the stator yoke and the winding bobbin portion of the stepping motor according to the third embodiment of the present invention.

FIG. 19 shows still another example concerning the stator yoke and the winding bobbin. In the example illustrated in the drawing, a pair of convex portion 51f and concave portion 52f, which mutually retain against movement in the inserting direction in the state that the inserting end portions 51a and 52a of the both yoke members 51 and 52 are joined to each other to form the continuous magnetic path, are provided separately on both the yoke members 51a and 52a. In this way, it is possible to further ensure and stabilize the state of magnetic and mechanical connection between the yoke members 51a and 52a.

Figure 20:
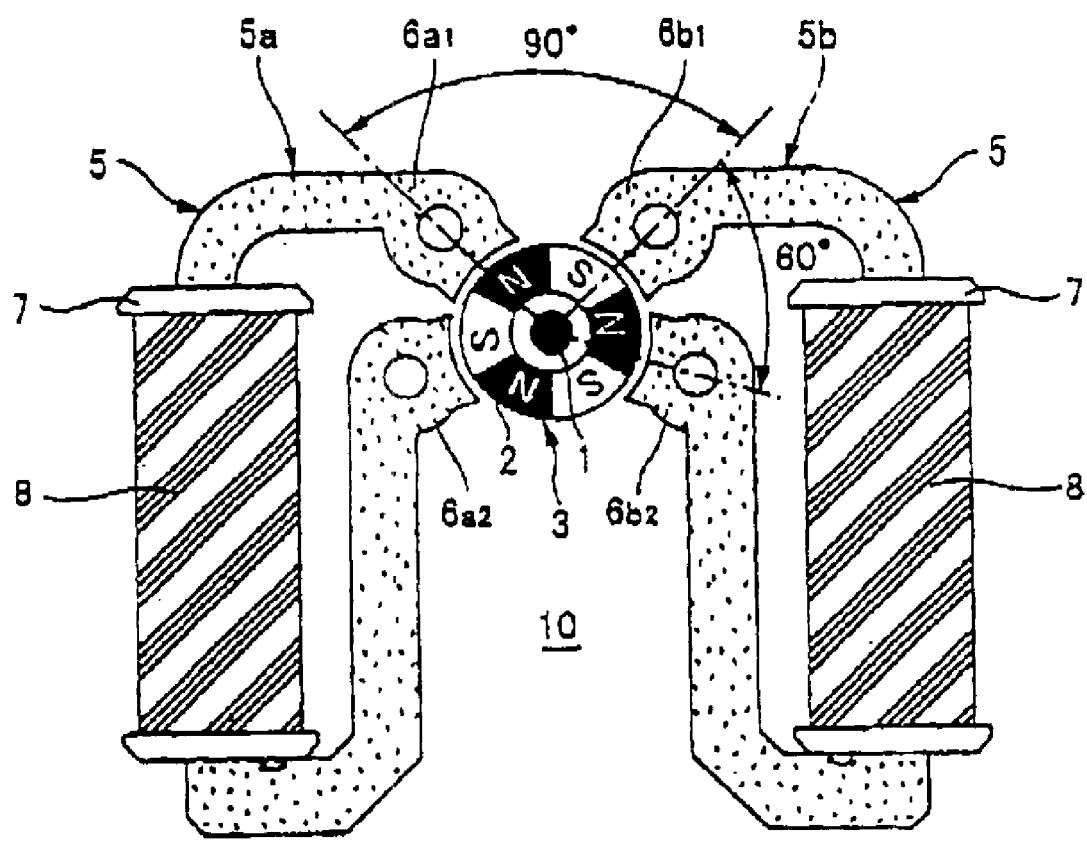
FIG. 20 is a plan view showing major parts of the stepping motor according to the third embodiment of the present invention) and FIG. 21 is a top side view showing an entire constitution of the stepping motor according to the third embodiment of the present invention.

FIG. 20 is a top side view showing an assembled state of major parts of the stepping motor according to the present invention. The stepping motor 10 shown in the drawing is constituted by use of any of the above-described stator yokes (FIG. 16 to FIG. 19). Firstly, the rotor 3 is formed by the annular permanent magnet 2 fitted rotatably and coaxially to the shaft 1. The permanent magnet 2 is formed of multiple poles magnetized to be reversed alternately by 60-degree pitches along the circumferential direction, thus including three pairs of six magnetic poles (i.e. three pole pairs). Two stator yokes 5a and 5b are disposed outside the rotor.

The respective stator yokes 5a and 5b severally have planar shapes equivalent to deformed U-shapes, and both tips of the U-shapes form the magnetic pole portions 6a1, 6a2, 6b1, and 6b2. The two stator yokes 5a and 5b have the planar shapes identical to each other and are disposed symmetrically on the right and the left sides so that the magnetic pole portions 6a1, 6a2, 6b1, and 6b2 face close to the magnetic pole-passing surface of the permanent magnet 2.

The tip surfaces of the respective magnetic pole portions 6a1, 6a2, 6b1, and 6b2 are severally formed into arc shapes along a concentric circle so as to face closely with equal spaces and in parallel to the outer peripheral surface, that is, the magnetic pole-passing surface of the permanent magnet 2. The magnetic poles 6a1 and 6a2, and the magnetic poles 6b1 and 6b2 are severally disposed so as to be positioned on both ends of the arc of the section with the central angle of 60 degrees centering on the rotating shaft 1, in order to coincide with the magnetic pole pitch of the permanent magnet 2. Moreover, the magnetic pole 5a1 and the magnetic pole 6b1 are disposed so as to be positioned on both ends of the arc of the section with the central angle of 90 degrees centering on the rotating shaft 1, in order to cause the phase difference at the electrical angle of 90 degrees.

The winding bobbin 7 is fitted to one of the U-shaped leg pair of each stator yoke 5a or 5b. As described above, the exciting coil 8 is pre-wound on this bobbin 7. In this way, the two-phase salient-pole type stepping motor 10 is formed. Although this two-phase stepping motor 10 in suitable for use in two-way driving of a pointer of a pointer instrument by open-loop control, such a two-phase stepping motor 10 used to have a problem that an assembly operation thereof tends to be complicated because of two stator yokes disposed therein. However, by use of the above-described stator yokes 5a and 5b, such an assembly operation can be performed efficiently and easily. Moreover, in the above-described two-phase stepping motor, the magnetic pole portions of the stator yokes 5a and 5b need to be disposed accurately and stably around the rotor 3. Such disposition can be also performed easily and in the excellent reproducibility by use of the above-described status yokes 5a and 5b.

Figure 21:
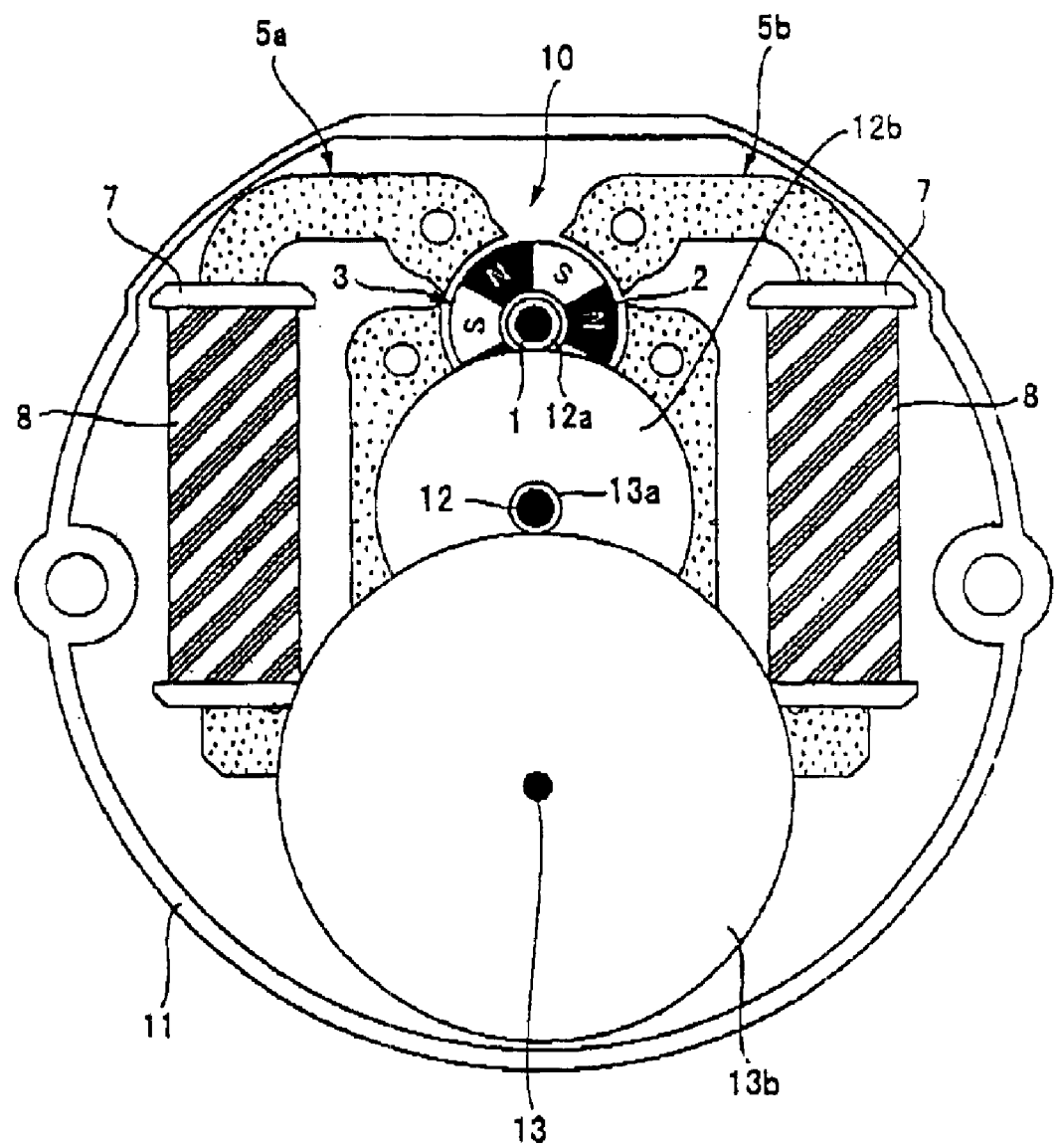

FIG. 21 is a top side view showing a state of incorporating the stepping motor 10 of this embodiment into the electrically insulative plastic casing 11 together with reducer gears.

In the drawing, the rotational output of the stepping motor 10 is taken out of the gear 12a which is integrally fixed to the rotor 3 made of the permanent magnet 2. Rotation of this rotating shaft 1 is reduced in speed and transmitted by a first pinion 12a axially connected to the rotating shaft 1, a first gearwheel 12b engaged with this first pinion 12a, a second pinion 13a integrated coaxially to this first gearwheel 12b, and a second gearwheel 13b engaged with this second pinion 13a, and is finally taken out of a rotating shaft 13 of the second gearwheel 13b.

As described above, in the third embodiment of the present invention, the stator yoke is formed with the first yoke member to be inserted from one opening of the bobbin, and the second yoke member to be inserted from the other opening of the bobbin. The respective inserting end portions of tho both yoke members form the continuous magnetic path between both the members by the joint portions plane-contacting to each other at least in two directions, both in the inserting direction and in the overlapping direction. At the same time, the joint portions are fixed inside the bobbin in the press-fit state. With the constitution, it is possible to obtain the stepping motor excellent in the workability of assembly while improving the quality such as the magnetic characteristics of the stators or rust proofing.

It is needless to describe in detail that various modifications are possible in the present invention. For example, a shaft may be rotatably supported on a case, and a rotor and gears may be integrally joined to this rotating shaft; or alternatively, the shaft may be fixed to the case, and the rotor and the gears may be rotatably placed to the fixed shaft.

Although the present invention has been described in light of a stepping motor for a pointer instrument which is the main usage thereof, the technology of the present invention is not limited to the above-described embodiments. For example, the present invention can be adopted to a watch or to an actuator not for a measurement instrument. Moreover, regarding the number of poles of the motor, multiple-pole structures other than the foregoing description is also feasible.

INDUSTRIAL APPLICABILITY

According to the present invention, it is possible to constitute a stepping motor having a suitable performance for smoothly driving a pointer of a pointer instrument, for example, by open-loop control.

To be more precise, the present invention is applicable to a geared motor embedding the stepping motor and a plurality of gears for reducing and transmitting rotation of this motor. Here, it is possible to achieve a smooth rotational, output by effectively reducing detent torque causing torque ripple to the rotational output, without deteriorating motor performances such as rotational torque.

Moreover, in the stepping motor and the geared motor, it is possible to solve various problems such as degradation of accuracy which occur along with use of an electrically insulative plastic casing. The present invention is advantageous to noise reduction, cost reduction and simplification of the structure of terminals, and is also capable of surely providing a smooth and stable rotating movement.

Further, with the above stepping motor and the above geared motor, there is provided a stepping motor which improves the magnetic characteristic and rust-proof quality of the stator and which is excellent in the workability of assembly.

What is claimed is:

1. A stepping motor comprising:
   a rotor including a permanent magnet having multiple magnetic poles magnetized to be reversed alternately along a circumferential direction;
   two or more stator yokes being disposed on an outer periphery of said rotor for forming multi-phase field magnet having two or more phases; and
   exciting coils for exciting said stator yokes,
   wherein magnetic pole portions of said stator yokes are disposed so as to face close to a magnetic pole-passing surface of said permanent magnet, and
   an intermediate magnetic substance being magnetically independent of said stator yokes located on both sides thereof is disposed in a given position between the two adjacent stator yokes for facing close to said magnetic pole-passing surface of said permanent magnet.

* * * * *